United States Patent [19]

Martin et al.

[11] Patent Number: 5,710,420

[45] Date of Patent: Jan. 20, 1998

[54] METHOD FOR EMBEDDING AND RECOVERING MACHINE-READABLE INFORMATION

[75] Inventors: Trevor L Martin, Burlington; John F. Oliver, Calgary, both of Canada

[73] Assignee: Xerox Corporation, Stamford, Conn.

[21] Appl. No.: 567,786

[22] Filed: Dec. 5, 1995

[51] Int. Cl.⁶ .................................................. G06K 19/06
[52] U.S. Cl. .......................................... 235/487; 235/494
[58] Field of Search ..................................... 235/487, 491, 235/494

[56] References Cited

U.S. PATENT DOCUMENTS

| | | | |
|---|---|---|---|
| 5,051,779 | 9/1991 | Hikawa | 355/200 |
| 5,091,966 | 2/1992 | Bloomberg et al. | 382/21 |
| 5,128,525 | 7/1992 | Stearns et al. | 235/454 |
| 5,168,147 | 12/1992 | Bloomberg | 235/456 |
| 5,291,243 | 3/1994 | Heckman et al. | 355/201 |
| 5,337,361 | 8/1994 | Wang et al. | 380/51 |

FOREIGN PATENT DOCUMENTS

| | | |
|---|---|---|
| 0459792 | 4/1991 | European Pat. Off. . |
| 0469864 | 5/1992 | European Pat. Off. . |
| 2683929 | 6/1993 | France ................... 235/470 |
| 1-283193 | 11/1989 | Japan . |

*Primary Examiner*—F. L. Evans
*Attorney, Agent, or Firm*—Judith L. Byorick

[57] ABSTRACT

Disclosed is a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in at least some of the photochromic marking material from the first state to the second state.

12 Claims, 2 Drawing Sheets

METHOD FOR EMBEDDING AND RECOVERING MACHINE-READABLE INFORMATION

BACKGROUND OF THE INVENTION

The present invention is directed to a process for embedding and recovering machine readable information on an object. More specifically, the present invention is directed to a process for printing machine readable information which can, by irradiation with radiation of an appropriate wavelength, be either rendered visible or invisible in a reversible process or changed from one color to another color in a reversible process. One embodiment of the present invention is directed to a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in at least some of the photochromic marking material from the first state to the second state.

Methods for encoding machine-readable information on documents, packages, machine parts, and the like, are known. One-dimensional symbologies, such as those employed in bar codes, are known. Two-dimensional symbologies generally are of two types-matrix codes and stacked bar codes. Matrix codes typically consist of a random checker board of black and white squares. Alignment features such as borders, bullseyes, start and stop bits, and the like, are included in the matrix to orient the matrix during scanning. Stacked bar codes consist of several one-dimensional bar codes stacked together. Two-dimensional symbologies have an advantage over one-dimensional symbologies of enabling greater data density. For example, a typical bar code can contain from about 9 to about 20 characters per inch, while a typical two-dimensional symbology can contain from about 100 to about 800 characters per square inch. Many two-dimensional symbologies also utilize error correction codes to increase their robustness. Examples of two-dimensional symbologies include PDF417, developed by Symbol Technologies, Inc., Data Matrix, developed by International Data Matrix, Vericode, developed by Veritec, Inc., CP Code, developed by Teiryo, Inc. and Integrated Motions, Inc., Maxicode, developed by the United Parcel Service, Softstrip, developed by Softstrip, Inc., Code One, developed by Laserlight Systems, Supercode, developed by Metanetics Inc., DataGlyph, developed by Xerox Corporation, and the like. One-dimensional and two-dimensional symbologies can be read with laser scanners or with video cameras. The scanners typically consist of an imaging detector coupled to a microprocessor for decoding. Scanners can be packaged into pen-like pointing devices or guns. Bar-like codes and methods and apparatus for coding and decoding information contained therein are disclosed in, for example, U.S. Pat. No. 4,692,603, U.S. Pat. No. 4,665,004, U.S. Pat. No. 4,728,984, U.S. Pat. No. 4,728,783, U.S. Pat. No. 4,754,127, and U.S. Pat. No. 4,782,221, the disclosures of each of which are totally incorporated herein by reference.

European Patent Application 469,864-A2 (Bloomberg et al.), the disclosure of which is totally incorporated herein by reference, discloses self-clocking glyph shape codes for encoding digital data in the shapes of glyphs that are suitable for printing on hardcopy recording media. Advantageously, the glyphs are selected so that they tend not to degrade into each other when they are degraded and/or distorted as a result, for example, of being photocopied, transmitted via facsimile, and/or scanned into an electronic document processing system. Moreover, for at least some applications, the glyphs desirably are composed of printed pixel patterns containing nearly the same number of on pixels and nearly the same number of off pixels, such that the code that is rendered by printing such glyphs on substantially uniformly spaced centers appears to have a generally uniform texture. In the case of codes printed at higher spatial densities, this texture is likely to be perceived as a generally uniform gray tone. Binary image processing and convolution filtering techniques for decoding such codes are also disclosed.

European Patent Application 459,792-A2 (Zdybel et al.), the disclosure of which is totally incorporated herein by reference, discloses the provision in electronic document processing systems for printing unfiltered or filtered machine-readable digital representations of electronic documents, and human-readable renderings of them on the same record medium using the same printing process. The integration of machine-readable digital representations of electronic documents with the human-readable hardcopy renderings of them may be employed, for example, not only to enhance the precision with which the structure and content of such electronic documents can be recovered by scanning such hardcopies into electronic document processing systems, but also as a mechanism for enabling recipients of scanned-in versions of such documents to identify and process annotations that were added to the hardcopies after they were printed and/or for alerting the recipients of the scanned-in documents to alterations that may have been made to the original human-readable content of the hardcopy renderings. In addition to storage of the electronic representation of the document, provision is made for encoding information about the electronic representation of the document itself, such as file name, creation and modification dates, access and security information, and printing histories. Provision is also made for encoding information which is computed from the content of the document and other information, for purposes of authentication and verification of document integrity. Provision is also made for the encoding of information which relates to operations which are to be performed depending on handwritten marks made upon a hardcopy rendering of the document; for example, encoding instructions of what action is to be taken when a box on a document is checked. Provision is also made for encoding in the hardcopy another class of information: information about the rendering of the document specific to that hardcopy, which can include a numbered copy of that print, the identification of the machine which performed that print, the reproduction characteristics of the printer, and the screen frequency and rotation used by the printer in rendering halftones. Provision is also made for encoding information about the digital encoding mechanism itself, such as information given in standard-encoded headers about subsequently compressed or encrypted digital information.

U.S. Pat. No. 5,128,525 (Stearns et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,291,243 (Heckman et al.), the disclosure of which is totally incorporated herein by reference, discloses a system for printing security documents which have copy detection or tamper resistance in plural colors with a single pass electronic printer printing an integrated image controlled by an image generation system which electronically generates a safety background image pattern with first and second interposed color patterns which is electronically merged with alphanumeric information and a protected signature into an integrated electronic image for the printer. The single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which become visible when copied, and/or are machine readable even in copies.

U.S. Pat. No. 5,168,147 (Bloomberg), the disclosure of which is totally incorporated herein by reference, discloses binary image processing techniques for decoding bitmap image space representations of self-clocking glyph shape codes of various types (e.g., codes presented as original or degraded images, with one or a plurality of bits encoded in each glyph, while preserving the discriminability of glyphs that encode different bit values) and for tracking the number and locations of the ambiguities (sometimes referred to herein as "errors") that are encountered during the decoding of such codes. A substantial portion of the image processing that is performed in the illustrated embodiment of the invention is carried out through the use of morphological filtering operations because of the parallelism that is offered by such operations. Moreover, the error detection that is performed in accordance with this invention may be linked to or compared against the error statistics from one or more alternative decoding process, such as the convolution filtering process that is disclosed herein, to increase the reliability of the decoding that is obtained.

U.S. Pat. No. 5,091,966 (Bloomberg et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,051,779 (Hikawa), the disclosure of which is totally incorporated herein by reference, discloses an image processing system which specifies input image information on the basis of existence of a special mark or patterns printed on a job control sheet. Selected one of various image processings is executed in accordance with the existence of the special mark or patterns to thereby obtain output image information. Each of the special marks or patterns are line drawings, each drawn so as to have a certain low correlative angle to the longitudinal and transverse directions of an image provided with the special mark or patterns.

U.S. Pat. No. 5,337,361 (Wang et al.), the disclosure of which is totally incorporated herein by reference, discloses a record which contains a graphic image and an information area which are interrelated to discourage misuse of the record. The information area can overlay the graphic image and include information encoded in an error-correctable, machine-readable format which allows recovery of the information despite distortion due to the underlying graphic image. The record may also represent the image by words similar in form to words in the information area. Both the information and graphic words can then be altered when an action regarding the record takes place.

Photochromism in general is a reversible change of a single chemical species between two states having distinguishably different absorption spectra, wherein the change is induced in at least one direction by the action of electromagnetic radiation. The inducing radiation, as well as the changes in the absorption spectra, are usually in the ultraviolet, visible, or infrared regions. In some instances, the change in one direction is thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, osazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as photochromic glasses, which are useful as, for example, ophthalmic lenses.

Copending application U.S. Ser. No. 08/567,637, filed Dec. 5, 1995, now U.S. Pat. No. 5,633,109, entitled "Ink Compositions With Liposomes Containing Photochromic Compounds," with the named inventors Carol A. Jennings, Marcel P. Breton, Mary A. Isabella, Eric G. Johnson, Trevor I. Martin, and John F. Oliver, the disclosure of which is totally incorporated herein by reference, discloses an ink composition which comprises an aqueous liquid vehicle, a photochromic material, and a vesicle-forming lipid, wherein vesicles of the lipid are present in the ink.

Copending application U.S. Ser. No. 08/567,456, filed Dec. 5, 1995, now U.S. Pat. No. 5,551,973, entitled "Photochromic Microemulsion Ink Compositions," with the named inventors John F. Oliver, Trevor I. Martin, Carol A. Jennings, Eric G. Johnson, and Marcel P. Breton, the disclosure of which is totally incorporated herein by reference, discloses an ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

Copending application U.S. Ser. No. 08/567,589, filed Dec. 5, 1995, now abandoned, entitled "Photochromic Electrostatic Toner Compositions," with the named inventors Trevor I. Martin, Carol A. Jennings, Eric G. Johnson, and John F. Oliver, the disclosure of which is totally incorporated herein by reference, discloses a toner composition for the development of electrostatic latent images which comprises particles comprising a mixture of a resin and a photochromic material. Another embodiment of the invention is directed to a liquid developer composition for the development of electrostatic latent images which comprises a nonaqueous liquid vehicle and a photochromic material, wherein the liquid developer has a resistivity of from about $10^8$ to about $10^{11}$ ohm-cm and a viscosity of from about 25 to about 500 centipoise. Yet another embodiment of the invention is directed to a liquid developer composition for the development of electrostatic latent images which comprises a nonaqueous liquid vehicle, a charge control agent, and toner particles comprising a mixture of a resin and a photochromic material.

Copending application U.S. Ser. No. 08/567,457, filed Dec. 5, 1995, now U.S. Pat. No. 5,593,486, entitled "Photochromic Hot Melt Ink Compositions," with the named inventors John F. Oliver, Trevor I. Martin, Carol A. Jennings, Eric G. Johnson, and Stephan V. Drappel, the disclosure of which is totally incorporated herein by reference, discloses a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, and (c) an optional propellant.

While known compositions and processes are suitable for their intended purposes, a need remains for processes for embedding and recovering machine readable information on an object. In addition, there is a need for processes for printing machine readable information which can, by irradiation with radiation of an appropriate wavelength, be either rendered visible or invisible in a reversible process or changed from one color to another color in a reversible process. Further, there is a need for processes which enable the placement of encoded information on documents which is not detectable to the reader but which is machine readable. Additionally, there is a need for processes which enable the selective alteration of machine readable information subsequent to printing the information.

SUMMARY OF THE INVENTION

It is an object of the present invention to provide methods and processes for embedding and recovering machine-readable information with the above noted advantages.

It is another object of the present invention to provide processes for embedding and recovering machine readable information on an object.

It is yet another object of the present invention to provide processes for printing machine readable information which can, by irradiation with radiation of an appropriate wavelength, be either rendered visible or invisible in a reversible process or changed from one color to another color in a reversible process.

It is still another object of the present invention to provide processes which enable the placement of encoded information on documents which is not detectable to the reader but which is machine readable.

Another object of the present invention is to provide processes which enable the selective alteration of machine readable information subsequent to printing the information.

These and other objects of the present invention (or specific embodiments thereof) can be achieved by providing a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in at least some of the photochromic marking material from the first state to the second state.

BRIEF DESCRIPTION OF THE DRAWINGS

Illustrated schematically in FIG. 1 is an example of a machine-readable code suitable for the present invention.

Illustrated schematically in FIG. 2 is a specific embodiment of the present invention wherein portions of a machine-readable code are selectively rendered visible or invisible.

DETAILED DESCRIPTION OF THE INVENTION

The present invention entails writing data in a predetermined machine readable code format on the substrate with a photochromic marking material and thereafter effecting a photochromic change in the photochromic marking material from the first state to the second state. Any suitable or desired machine readable code format may be selected, including one-dimensional symbologies such as bar codes, two-dimensional symbologies such as stacked bar codes, matrix codes, codes such as PDF417, or the like.

In one embodiment of the present invention, a photochromic marking material is employed to generate images in a self-clocking "glyph" code as disclosed in, for example, U.S. Pat. No. 5,051,779, U.S. Pat. No. 5,128,525, U.S. Pat. No. 5,291,243, U.S. Pat. No. 5,168,147, U.S. Pat. No. 5,091,966, European Patent Application 469,864-A2, and European Patent Application 459,792-A2, the disclosures of each of which are totally incorporated herein by reference. In one embodiment, this code comprises printed glyphs which represent 0 and 1 bits in a document encoding scheme. The glyphs are printed at a uniform distance from each other, so that the center of each glyph is a uniform distance from the center of the adjacent glyph(s). The visual appearance of the marks, to the naked eye, thus becomes a textured grayish area. These marks can be printed at very high densities of 3600 data bits per square inch or higher and scanned with a 300 pixel per inch scanner. Data is encoded by the shape or the rotational orientation of the mark. Clocking can be taken from the data itself, without synchronization marks external to the data. By placing a mark at each data bit position, it is easier to synchronize the reading process of the data without the use of registration marks. The number of bits that can be represented by each symbol is related to the total number of symbols in the code; when the number of bits to be represented by a symbol is "n", the total number of glyphs possible in the code is $2^n$ distinctive glyphs. For example, in a code wherein two distinct glyphs are possible, such as / and \, each symbol can represent one bit; for example, /=1 and \=0. In a code wherein four distinct glyphs are possible, such as /, |, \, and -, each symbol can represent two bits; for example, /=00, |=01, \=10, and -=11. In a code wherein eight distinct glyphs are possible, each symbol can represent three bits, and the like. Data can be encoded in the shape of the glyphs, the rotation of the glyphs, or in any other desired variation.

Figure 1:
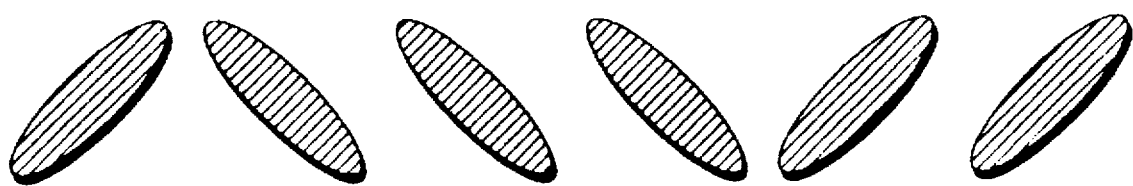

In a specific embodiment, the glyphs are elliptical marks, and in a simple code wherein two distinct shapes are possible, the glyphs preferably are elliptical marks rotated from the vertical at either about +45° or −45°, as shown in FIG. 1. An example of a typical encoding sequence in this embodiment is shown in FIG. 1, wherein, for example, the first, fifth, and sixth glyphs represent 1s and the second, third, and fourth glyphs represent 0s. The use of orthogonally-oriented marks potentially allows for a large degree of discrimination between data bit 1 and data bit 0. The marks preferably are inclined at about 45°, rather than being horizontal or vertical, because (a) there is less tendency for adjacent marks to touch; (b) the eye is less sensitive to diagonal lines than to vertical or horizontal lines; and (c) printing and scanning non-uniformities tend to be horizontal (banding) or vertical (photodetector array response variations). In a preferred embodiment, the two glyphs preferably are each elongated multi-pixel symbols having the same number of adjacent "ON" pixels and differ from each other in their rotation from the vertical. These specific glyphs are readily discriminable from each other, even in the presence of significant distortion and image degradation, because they do not tend to degrade into a common shape. In addition, since all of the glyphs have the same number of "ON" pixels, the printed glyph code has a generally uniform texture, which will take the form of a gray scale appearance when higher density glyphs are viewed by a casual observer.

The glyphs can be decoded by any suitable or desired method. Bitmap images of the glyphs can be processed even when image distortion or degradation has occurred by, for example, facsimile transmission, scanning of photocopies, or the like. In certain decoders, the image processing which is performed for decoding the glyph codes first locates the glyphs in the X-Y coordinates of the bitmap image space, then constructs a table for indexing the glyphs in the spatial order in which data was encoded in them, and then analyzes the glyphs in indexed order for sequentially extracting the data values encoded therein. In other decoders, the image processing classifies the glyphs by their shapes while concurrently locating their centers in the bitmap image space, so the decoded values of the glyphs conveniently are indexed to the bitmap image space. These spatially indexed decoded data values may be sorted in accordance with the spatial template or pattern that governs their spatial ordering if it is desired to restore their serial order in the time domain.

When glyph codes are printed with conventional marking materials, at least a portion of the printed document is permanently printed with what appears to be a relatively uniformly-textured gray scale image. When large amounts of information are present, the entire printed sheet can be covered with a "carpet" of glyphs which form the background upon which the information intended to be read by the naked eye is printed. The present invention enables the generation of glyph codes in patterns that are capable of being rendered visible or invisible by effecting a photochromatic change, such as by irradiation of part or all of the glyph pattern with radiation of a wavelength that effects a photochromatic change in the marking material used to print the glyphs. Thus, the glyph pattern or glyph carpet can be rendered invisible unless or until needed for machine reading, thereby further improving the appearance of the document. In some instances, the photochromic shift is induced in one direction by irradiation with light and in the opposite direction by application of heat. In these instances, heat and/or light are applied as appropriate to obtain the desired color or lack thereof.

Figure 2:
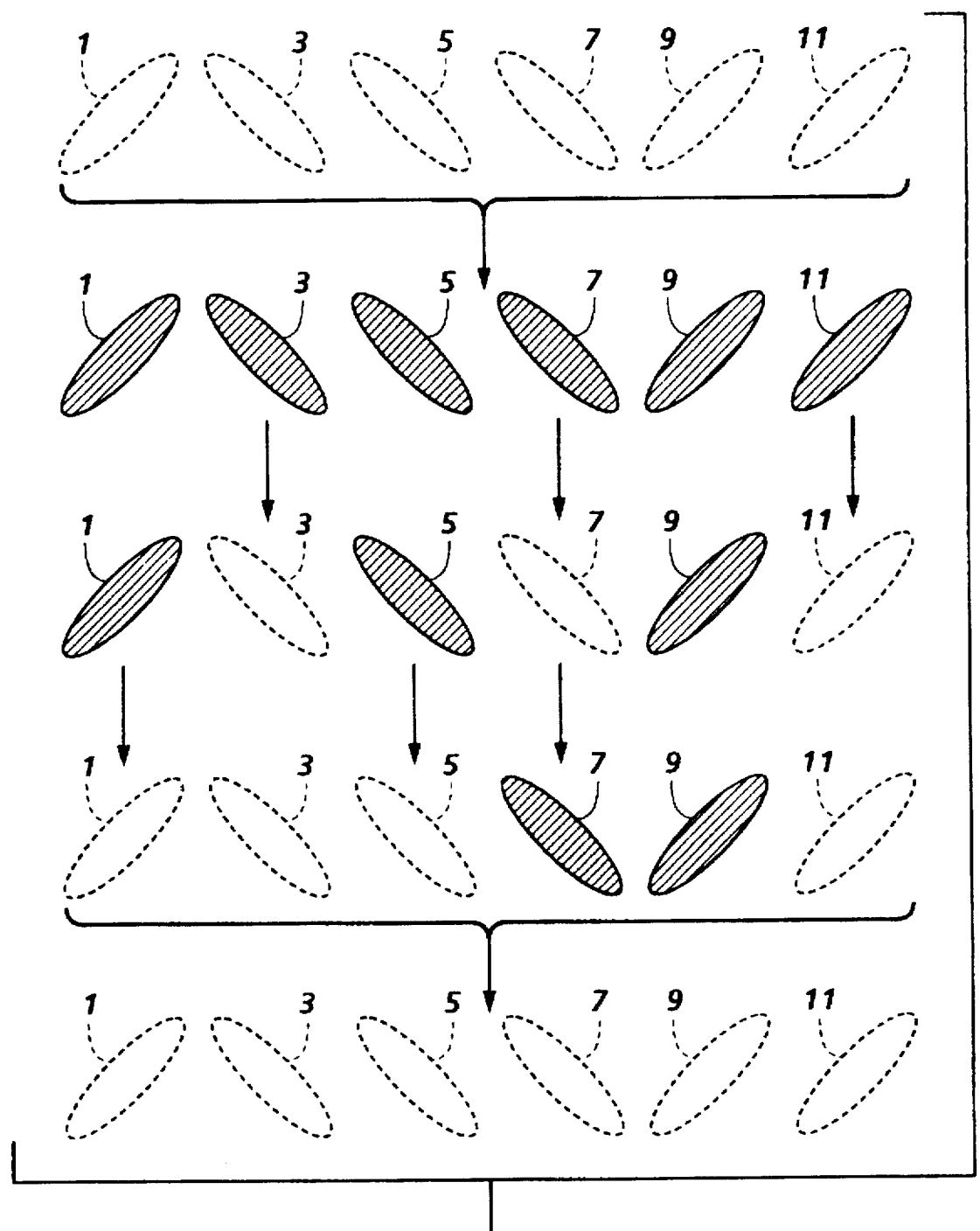

In addition, when glyph codes are printed with a photochromic marking material, an additional variable can be introduced into the code, which variable can be adjusted subsequent to printing. Each glyph is analyzed by the machine scanner and processor, not only for its shape or orientation, but also for its presence or absence. Thus, after a glyph pattern is initially printed, individual glyphs can later be turned "ON" or "OFF" by selectively effecting a photochromic shift in the glyphs desired to be turned "ON" or "OFF" by, for example, radiation of a wavelength that effects a photochromatic change in the marking material used to print the glyphs. The "0" bit can thus be either ON or OFF, and the "1" bit can be either ON or OFF, and the ON and OFF states of any glyph can be selected at will, in a continuously recyclable manner. An example of such a process is illustrated in FIG. 2. As shown in FIG. 2, glyphs 1, 3, 5, 7, 9, and 11 are first printed onto substrate 20 with a photochromic marking material that is initially colorless, such as 1,3-dihydro-1,3,3-trimethylspiro[2H-indole-2,3'-3H]-naphth[2,1-b][1,4]oxazine (Aldrich 32,254-7) (CAS #27333-47-7), and which turns blue subsequent to irradiation with ultraviolet light. (In the event that the glyphs exhibit any visibility subsequent to initial printing, flood exposure to red light at, for example, 630 nanometers, renders the glyphs colorless.) Thereafter, glyphs 1, 3, 5, 7, 9, and 11 are all irradiated with ultraviolet light, thereby effecting a photochromic change and rendering them visible and machine readable. Subsequently, glyphs 3, 7, and 11, now visible, are selectively irradiated with light in the red wavelength region, at, for example, 630 nanometers, which effects the reverse photochromic change and renders these glyphs invisible, while glyphs 1, 5, and 9 remain visible. Thereafter, glyphs 1 and 5 are irradiated with red light, rendering them invisible, and glyph 7 is irradiated with ultraviolet light, rendering it visible. Subsequently, all of the glyphs are irradiated with red light, returning all of the glyphs to the invisible state.

Selective adjustment of the "ON" and "OFF" states of individual glyphs can enable easier differentiation and resolution of the visible glyphs, since the invisible glyphs are not present as "background". Additionally, an encoded message can be partially or completely erased, or portions of the message can be selectively changed from one color to another, for security purposes.

Uniform or selective adjustment of encoded images clearly can be extended beyond the specific "glyph" embodiment to any other one-dimensional or two-dimensional machine-readable code. For example, bar codes are frequently employed to identify automobile and airplane parts, for purposes such as prevention of cannibalizing of automobiles and subsequent sale of the parts, or identification of automobile or aircraft parts which fail after accidents or crashes. By printing the entire code with a photochromic marking material, the code itself is invisible unless and until heated or irradiated with radiation of the appropriate wavelength to effect a photochromic change of the marking material to a color which is detectable by the machine reader, and the code can once again be rendered invisible subsequent to reading. Selectively rendering portions of the code invisible, or of a color different from the rest of the code, enables a further security measure. Many photochromic materials switch from one state to another with extreme rapidity, in some instances faster than the human eye can detect. Thus, printed photochromic encoded information can be rendered visible for periods of about a millisecond, read by the machine detector, and subsequently switched back to the invisible state without a human onlooker being able to detect the process.

The photochromic marking material can be any material suitable for generating images on the selected substrate which contains a photochromic material. Examples of suitable materials include inks, including lithographic and flexographic inks, aqueous inks, including those suitable for use with ink jet printing processes, liquid and dry toner materials suitable for use in electrostatic imaging processes, hot melt inks, including those suitable for use with ink jet printing processes, and the like.

Examples of suitable photochromic materials include compounds that undergo heterolytic cleavage, such as spiropyrans and related compounds, and the like; compounds that undergo homolytic cleavage, such as bis-imidazole compounds, bis-tetraphenylpyrrole, hydrazine compounds, aryl disulfide compounds, and the like; compounds that undergo cis-trans isomerization, such as stilbene compounds, photoisomerizable azo compounds, and the like; compounds that undergo photochromic tautomerism, including those that undergo hydrogen transfer phototautomerism, those that undergo photochromic valence tautomerism, and the like; and others.

More specifically, examples include spiropyrans, of the general formula

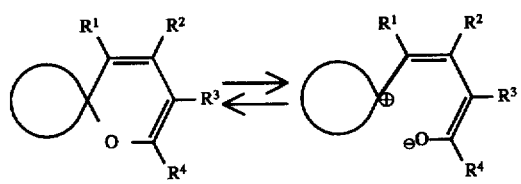

wherein $R^1$, $R^2$, $R^3$, and $R^4$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Also suitable are spirooxazines, of the general formula

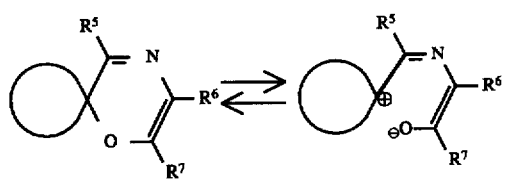

wherein $R^5$, $R^6$, and $R^7$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Also suitable are spirothiopyrans, of the general formula

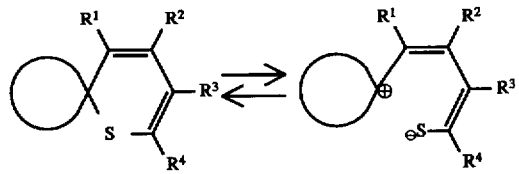

wherein $R^1$, $R^2$, $R^3$, and $R^4$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 30 carbon atoms and more preferably with from about 5 to about 20 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Examples of spiropyrans include spiro[2H-1-benzopyran-2,2'-indolines], including those of the general formula

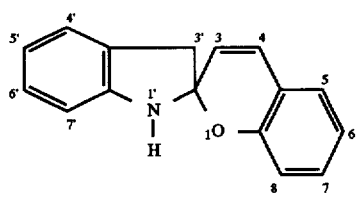

wherein substituents can be present on one or more of the 1', 3', 4', 5', 6', 7', 3, 4, 5, 6, 7, and 8 positions, spiroindolinonaphthopyrans, including those of the general formula

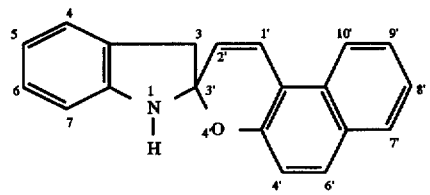

wherein substituents can be present on one or more of the 1, 3, 4, 5, 6, 7, 1', 2', 5', 6', 7', 8', 9', or 10' positions, spiro[2H-1-benzopyran-2,2'benzothiazolines], including those of the general formula

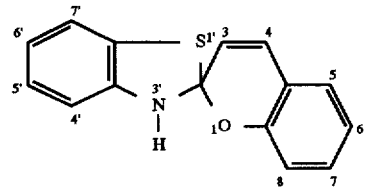

wherein substituents can be present on one or more of the 1', 3', 4', 5', 6', 7', 3, 4, 5, 6, 7, and 8 positions, spiro[2H-1-benzopyran-2,2'-benzoxazolines], including those of the general formula

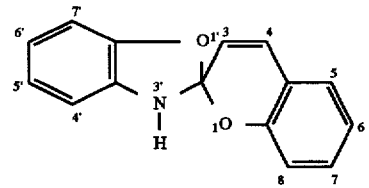

wherein substituents can be present on one or more of the 1', 3', 4', 5', 6', 7', 3, 4, 5, 6, 7, and 8 positions, spiropyranopyrans, including those of the general formula

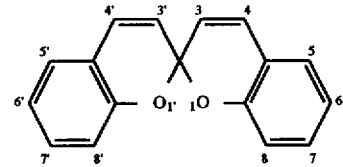

wherein substituents can be present on one or more of the 3, 4, 5, 6, 7, 8, 3', 4', 5', 6', 7', and 8' positions, azaspiroindolinopyrans, including those of the general formula

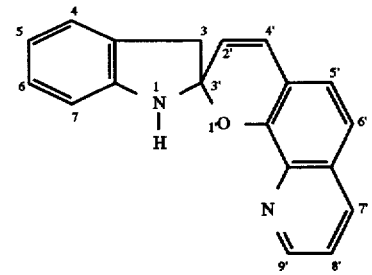

wherein substituents can be present on one or more of the 3, 4, 5, 6, 7, 3', 4', 5', 6', 7', 8', and 9' positions, spiro (quinolinopyrans), including those of the general formula

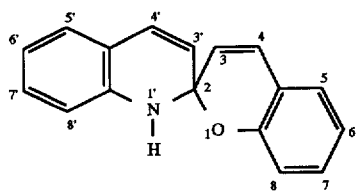

wherein substituents can be present on one or more of the 3, 4, 5, 6, 7, 8, 3', 4', 5', 6', 7', and 8' positions, spiro(pyridino pyrans), including those of the general formula

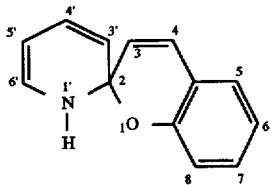

wherein substituents can be present on one or more of the 3, 4, 5, 6, 7, 8, 3', 4', 5', and 6' positions, and the like.

Examples of spirooxazines include spiro[indoline-2,3'-[3H]-naphtho[2,1-b]-1,4-oxazines], including those of the general formula

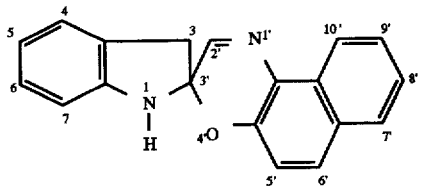

wherein substituents can be present on one or more of the 1, 3, 4, 5, 6, 7, 1', 2', 5', 6', 7', 8', 9', or 10' positions, spiro[2H-1,4-benzoxazine-2,2'-indolines], including those of the general formula

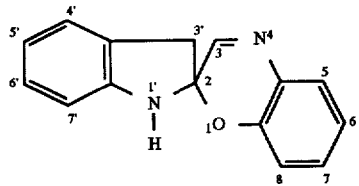

wherein substituents can be present on one or more of the 3, 5, 6, 7, 8, 1', 4', 5', 6', and 7' positions, and the like.

Examples of spirothiopyrans include spiro[2H-1-benzothiopyran-2,2'-indolines], including those of the general formula

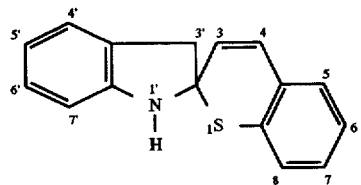

wherein substituents can be present on one or more of the 1', 3', 4', 5', 6', 7', 3, 4, 5, 6, 7, and 8 positions, and the like.

In all of the above examples of spiropyrans, spirooxazines, and spirothiopyrans, examples of substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Substituents on the left ring of the spiropyrans, spirooxazines, and spirothiopyrans (represented by the loop in the generic structural formulae of these materials) can be adjusted to affect the color of the open form of the material. Substituents on the central moiety of the spiropyrans, spirooxazines, and spirothiopyrans or on alkyl or aryl groups attached thereto also affect the color of the open form of the material, although to a lesser degree than substituents on the left ring. Further, when the left ring contains a nitrogen atom, this atom or other atoms can be substituted to affect the solubility of the compound in various liquids and resins. For example, long chain hydrocarbons, such as those with 16 or 18 carbon atoms, can increase solubility in hydrocarbons. Sulfonate and carboxylate groups, for example, can enhance water solubility.

Specific examples of spiropyrans, spirooxazines, and spirothiopyrans include spiro[2H-1-benzopyran-2,2'-indoline]; 8-acetoxymercuri-6-nitro-1',3',3'-trimethylspiro[2H-1-benzopyran-2,2'-indoline]; 6-acetyl-1',3'3'-trimethylspiro[2H-1-benzopyran-2,2'-indoline]; 8-allyl-5'-chloro-6-nitro-1',3',3'-trimethylspiro[2H-1-benzopyran-2,2'-indoline]; 8-allyl-3',3'-dimethyl-6'-nitro-1'-phenylspiro[2H-1-benzopyran-2,2'-indoline]; 8-allyl-6-nitro-1',3,3',3'-tetramethylspiro[2H-1-benzopyran-2,2'-indoline]; 8-allyl-6-nitro-1',3',3'-trimethylspiro[2H-1-benzopyran-2,2'- indoline]; 8-allyl-1',3',3'-trimethylspiro[2H-1-benzopyran-2,2'-indoline]; 5'-amino-5,7-dichloro-6-nitro-1',3',3'-trimethylspiro[2H-1-benzopyran-2,2'-indoline]; 6-amino-7-hydroxy-1',3',3'-trimethylspiro[2H-1-benzopyran-2,2'-indoline]; 5'-amino-8-methoxy-6-nitro-1',3',3'-trimethylspiro[2H-1-benzopyran-2,2'-indoline]; 5-amino-8-methoxy-1',3',3'-trimethylspiro[2H-1-benzopyran-2,2'-indoline]; 5'-amino-8-methoxy-1',3',3'-trimethylspiro[2H-1-benzopyran-2,2'-indoline]; 5'-amino-6-nitro-1',3',3'-trimethylspiro[2H-1-benzopyran-2,2'-indoline]; 5'-amino-1',3',3'-trimethylspiro[2H-1-benzopyran-2,2'-indoline]; 6-amino-1',3',3'-trimethylspiro[2H-1-benzopyran-2,2'-indoline]; 8-amino-1',3',3'-trimethylspiro[2H-1-benzopyran-2,2'-indoline]; 1'-amyl-5-bromo-3',3'-dimethyl-8-methoxy-6-nitrospiro[2H-1-benzopyran-2,2'-indoline]; 1'-amyl-3',3'-dimethyl-8-methoxyspiro[2H-1-benzopyran-2,2'-indoline]; 1'-amyl-3',3-dimethyl-6-methoxy-8-nitrospiro[2H-1-benzopyran-2,2'-indoline]; 1'-amyl-3',3-dimethyl-5',6-dinitro-8-methoxyspiro[2H-1-benzopyran-2,2'-indoline]; 1'-amyl-3',3-dimethyl-8-methoxy-5,5',6-trinitrospiro[2H-1-benzopyran-2,2'-indoline]; 1'-amyl-3,3'-dimethyl-6-nitrospiro[2H-1-benzopyran-2,2'-indoline]; 6-bromo-1'-butyl-3',3'-dimethylspiro[2H-1-benzopyran-2,2'-indoline]; 8-bromo-1'-butyl-3',3'-dimethyl-6-nitrospiro[2H-1-benzopyran-2,2'-indoline]; 8-bromo-5'-chloro-5,7-dimethoxy-6-nitro-1',3',3'-trimethylspiro[2H-1-benzopyran-2,2'-indoline]; 8-bromo-5'-chloro-7-hydroxy-1',3',3'-trimethylspiro[2H-1-benzopyran-2,2'-indoline]; 5-bromo-5'-chloro-8-methoxy-1',3',3'-trimethylspiro[2H-1-benzopyran-2,2'-indoline]; 6-bromo-5'-chloro-8-methoxy-1',3',3'-trimethylspiro[2H-1-benzopyran-2,2'-indoline]; 5-bromo-6'-chloro-8-methoxy-6-nitro-1',3',3',7'-tetramethylspiro[2H-1-benzopyran-2,2'-indoline]; 5-bromo-5'-chloro-6-methoxy-8-nitro-1',3',3'-trimethylspiro[2H-1-benzopyran-2,2'-indoline]; 5-bromo-5'-chloro-8-methoxy-6-nitro-1',3',3'-trimethylspiro[2H-1-benzopyran-2,2'-indoline]; 5-bromo-7'-chloro-8-methoxy-6-nitro-1',3',3'-trimethylspiro[2H-1-benzopyran-2,2'-indoline]; 6-bromo-5'-chloro-8-nitro-1',3',3'-trimethylspiro[2H-1-benzopyran-2,2'-indoline]; 8-bromo-5'-chloro-6-nitro-1',3',3'-trimethylspiro[2H-1-benzopyran-2,2'-indoline]; 5-bromo-4',6'-dichloro-8-methoxy-6-nitro-1',3',3'-trimethylspiro[2H-1-benzopyran-2,2'-indoline]; 5-bromo-4',7'-dichloro-8-methoxy-6-nitro-1',3',3'-trimethylspiro[2H-1-benzopyran-2,2'-indoline]; 5-bromo-5',7'-dichloro-8-methoxy-6-nitro-1',3',3'-trimethylspiro[2H-1-benzopyran-2,2'-indoline]; 6-bromo-5'-chloro-1',3',3'-trimethylspiro[2H-1-benzopyran-2,2'-indoline]; 5-bromo-3',3'-diethyl-8-methoxy-1'-methyl-6-nitrospiro[2H-1-benzopyran-2,2'-indoline]; 5-bromo-5',8-dimethoxy-6-nitro-1',3',3'-trimethylspiro[2H-1-benzopyran-2,2'-indoline]; 5-bromo-7',8-dimethoxy-6-nitro-1',3',3'-trimethylspiro[2H-1-benzopyran-2,2'-indoline]; 6-bromo-5',8-dimethoxy-1',3',3'-trimethylspiro[2H-1-benzopyran-2,2'-indoline]; 6-bromo-3',3'-dimethyl-1'ethylspiro[2H-1-benzopyran-2,2'-indoline]; 6-bromo-3',3'-dimethyl-1'ethyl-8-methoxyspiro[2H-1-benzopyran-2,2'-indoline]; 5-bromo-1',3'-dimethyl-3'-ethyl-6-methoxy-8-nitrospiro[2H-1-benzopyran-2,2'-indoline]; 5-bromo-1',3'-dimethyl-3'-ethyl-8-methoxy-6-nitrospiro[2H-1-benzopyran-2,2'-indoline]; 8-bromo-3',3'-dimethyl-1'-ethyl-6-nitrospiro[2H-1-benzopyran-2,2'-indoline]; 5-bromo-3',3'-dimethyl-1'-isoamyl-8-methoxy-6-nitrospiro[2H-1-benzopyran-2,2'-indoline]; 5-bromo-1',3'-dimethyl-6-methoxy-8-nitro-3'-phenylspiro[2H-1-benzopyran-2,2'-indoline]; 5-bromo-1',3'-dimethyl-8-methoxy-6-nitro-3'-phenylspiro[2H-1-benzopyran-2,2'-indoline]; 5-bromo-3',3'-dimethyl-6-methoxy-8-nitro-1'-phenylspiro[2H-1-benzopyran-2,2'-indoline]; 5-bromo-3',3'-dimethyl-8-methoxy-6-nitro-1'-phenylspiro[2H-1-benzopyran-2,2'-indoline]; 8-bromo-3',3'-dimethyl-6-nitro-1'-propylspiro[2H-1-benzopyran-2,2'-indoline]; 6-bromo-3',3'-dimethyl-1'-propylspiro[2H-1-benzopyran-2,2'-indoline]; 5-bromo-1'-dimethylamino-8-methoxy-3'-methyl-6-nitro-3'-phenylspiro[2H-1-benzopyran-2,2'-indoline]; 5-bromo-5',6-dinitro-8-methoxy-1',3',3'-trimethylspiro[2H-1-benzopyran-2,2'-indoline]; 5-bromo-3',3'-diphenyl-8-methoxy-1'-methyl-6-nitrospiro[2H-1-benzopyran-2,2'-indoline]; 5-bromo-4',6'-diphenyl-8-methoxy-6-nitro-1',3',3'-trimethylspiro[2H-1-benzopyran-2,2'-indoline]; 5-bromo-4'-fluoro-8-methoxy-6-nitro-1',3',3'-trimethylspiro[2H-1-benzopyran-2,2'-indoline]; 5-bromo-5'-fluoro-8-methoxy-6-nitro-1',3',3'-trimethylspiro[2H-1-benzopyran-2,2'-indoline]; 8-bromo-7-hydroxy-1',3',3'-trimethylspiro[2H-1-benzopyran-2,2'-indoline]; 5-bromo-8-methoxy-6-nitro-1',3',3',4',7'-pentamethylspiro[2H-1-benzopyran-2,2'-indoline]; 5-bromo-8-methoxy-6-nitro-1',3',3',5',7'-pentamethylspiro[2H-1-benzopyran-2,2'-indoline]; 5-bromo-6-methoxy-8-nitro-5'-phenyl-1',3',3'-trimethylspiro[2H-1-benzopyran-2,2'-indoline]; 5-bromo-6-methoxy-8-nitro-7'-phenyl-1',3',3'-trimethylspiro[2H-1-benzopyran-2,2'-indoline]; 5-bromo-8-methoxy-6-nitro-5'-phenyl-1',3',3'-trimethylspiro[2H-1-benzopyran-2,2'-indoline]; 5-bromo-8-methoxy-6-nitro-7'-phenyl-1',3',3'-trimethylspiro[2H-1-benzopyran-2,2'-indoline]; 5-bromo-8-methoxy-6-nitro-1',3,3',3'-tetramethylspiro[2H-1-benzopyran-2,2'-indoline]; 5-bromo-8-methoxy-6-nitro-1',3',3',5'-tetramethylspiro[2H-1-benzopyran-2,2'-indoline]; 5-bromo-8-methoxy-6-nitro-1',3',3',6'-tetramethylspiro[2H-1-benzopyran-2,2'-indoline]; 5-bromo-8-methoxy-6-nitro-1',3',3',7'-tetramethylspiro[2H-1-benzopyran-2,2'-indoline]; 5-bromo-6-methoxy-8-nitro-1',3',3'-trimethylspiro[2H-1-benzopyran-2,2'-indoline]; 5'-bromo-6-methoxy-8-nitro-1',3',3'-trimethylspiro[2H-1-benzopyran-2,2'-indoline]; 5-bromo-8-methoxy-6-nitro-1',3',3'-trimethylspiro[2H-1benzopyran-2,2'-indoline]; 5'-bromo-8-methoxy-6-nitro-1',3',3'-trimethylspiro[2H-1-benzopyran-2,2'-indoline]; 6-bromo-8-methoxy-5-nitro-1',3',3'-trimethylspiro[2H-1-benzopyran-2,2'-indoline]; 5-bromo-8-methoxy-6-nitro-1',3',3'-trimethyl-4',6',7'-triphenylspiro[2H-1-benzopyran-2,2'-indoline]; 5-bromo-8-methoxy-1',3',3'-trimethylspiro[2H-1-benzopyran-2,2'-indoline]; 6-bromo-5'-methoxy-1',3',3'-trimethylspiro[2H-1-benzopyran-2,2'-indoline]; 6-bromo-8-methoxy-1',3',3'-trimethylspiro[2H-1-benzopyran-2,2'-indoline]; 6-bromo-8-nitro-1',3',3',3'-tetramethylspiro[2H-1-benzopyran-2,2'-indoline]; 8-bromo-6-nitro-1',3',3',3'-tetramethylspiro[2H-1-benzopyran-2,2'-indoline]; 5-bromo-6-nitro-4',6',8-trimethoxy-1',3',3'-trimethylspiro[2H-1-benzopyran-2,2'-indoline]; 5-bromo-6-nitro-4',7',8-trimethoxy-1',3',3'-trimethylspiro[2H-1-benzopyran-2,2'-indoline]; 5-bromo-6-nitro-1',3',3'-trimethylspiro[2H-1-benzopyran-2,2'-indoline]; 5'-bromo-6-nitro-1',3',3'-trimethylspiro[2H-1-benzopyran-2,2'-indoline]; 6-bromo-8-nitro-1',3',3'-trimethylspiro[2H-1-benzopyran-2,2'-indoline]; 8-bromo-6-nitro-1',3',3'-trimethylspiro[2H-1-benzopyran-2,2'-indoline]; 6-bromo-5'-nitro-1',3',3'-trimethylspiro[2H-1-benzopyran-2,2'indoline]; 6-bromo-1',3',3'-trimethylspiro[2H-1-benzopyran-2,2'-indoline]; 1'-butyl-6-chloro-3',3'-dimethyl-8-methoxyspiro[2H-1-benzopyran-2,2'-indoline]; 1'-butyl-3',3'-dimethylspiro[2H-1-benzopyran-2,2'-indoline]; 1'-butyl-3',3'-dimethyl-6,8-dinitrospiro[2H-1-benzopyran-2,2'-indoline]; 1'-butyl-3',3'-dimethyl-8-methoxyspiro[2H-1-benzopyran-2,2'-indoline]; 8-carbomethoxy-5'-chloro-1',3',3'-trimethylspiro[2H-1-benzopyran-2,2'-indoline]; 5'-carbomethoxy-6-nitro-1',3',3'- trimethylspiro[2H-1-benzopyran-2,2'-indoline]; 8-carbomethoxy-6-nitro-1',3',3'-trimethylspiro[2H-1-benzopyran-2,2'-indoline]; 6-carbomethoxy-1',3',3'-trimethylspiro[2H-1-benzopyran-2,2'-indoline]; 8-carbomethoxy-1',3',3'-trimethylspiro[2H-1-benzopyran-2,2'-indoline]; 6-carboxy-8-methoxy-1',3',3'-trimethylspiro[2H-1-benzopyran-2,2'-indoline]; 5'-carboxy-6-nitro-1',3',3'-trimethylspiro[2H-1-benzopyran-2,2'-indoline]; 6-carboxy-1',3',3'-trimethylspiro[2H-1-benzopyran-2,2'-indoline]; 7-carboxy-1',3',3'-trimethylspiro[2H-1-benzopyran-2,2'-indoline]; 8-carboxy-1',3',3'-trimethylspiro[2H-1-benzopyran-2,2'-indoline]; 5'-chloro-6,8-dibromo-1',3',3'-trimethylspiro[2H-1-benzopyran-2,2'-indoline]; 6'-chloro-5,7-dimethoxy-6-nitro-1',3',3',7'-tetramethylspiro[2H-1-benzopyran-2,2'-indoline]; 5'-chloro-5,7-dimethoxy-6-nitro-1',3',3'-trimethylspiro[2H-1-benzopyran-2,2'-indoline]; 5'-chloro-7,8-dimethoxy-6-nitro-1',3',3'-trimethylspiro[2H-1-benzopyran-2,2'-indoline]; 7'-chloro-5,7-dimethoxy-6-nitro-1',3',3'-trimethylspiro[2H-1-benzopyran-2,2'-indoline]; 5'-chloro-5,7-dimethoxy-1',3',3'-trimethylspiro[2H-1-benzopyran-2,2'-indoline]; 6-chloro-5',8-dimethoxy-1',3',3'-trimethylspiro[2H-1-benzopyran-2,2'-indoline]; 6-chloro-7',8-dimethoxy-1',3',3'-trimethylspiro[2H-1-benzopyran-2,2'-indoline]; 6-chloro-3',3'-dimethyl-1'-ethyl-8-methoxyspiro[2H-1-benzopyran-2,2'-indoline]; 5-chloro-1',3'-dimethyl-8-methoxy-6-nitro-3'-phenylspiro[2H-1-benzopyran-2,2'-indoline]; 6-chloro-3',3'-dimethyl-8-methoxy-1'-phenylspiro[2H-1-benzopyran-2,2'-indoline]; 6-chloro-3',3'-dimethyl-8-nitro-1'-phenylspiro[2H-1-benzopyran-2,2'-indoline]; 5'-chloro-5,6-dinitro-8-methoxy-1',3',3'-trimethylspiro[2H-1-benzopyran-2,2'-indoline]; 5'-chloro-6,6'-dinitro-8-methoxy-1',3',3'-trimethylspiro[2H-1-benzopyran-2,2'-indoline]; 5'-chloro-6,8-dinitro-7-methoxy-1',3',3'-trimethylspiro[2H-1-benzopyran-2,2'-indoline]; 7'-chloro-5,6-dinitro-8-methoxy-1',3',3'-trimethylspiro[2H-1-benzopyran-2,2'-indoline]; 5'-chloro-6,6'-dinitro-1',3',3'-trimethylspiro[2H-1-benzopyran-2,2'-indoline]; 5'-chloro-6,8-dinitro-1',3',3'-trimethylspiro[2H-1-benzopyran-2,2'-indoline]; 6-chloro-5',8-dinitro-1',3',3'-trimethylspiro[2H-1-benzopyran-2,2'-indoline]; 5'-chloro-7-ethoxy-6-nitro-1',3',3'-trimethylspiro[2H-1-benzopyran-2,2'-indoline]; 5-chloro-8-ethoxy-6-nitro-1',3',3'-trimethylspiro[2H-1-benzopyran-2,2'-indoline]; 5'-chloro-8-ethoxy-6-nitro-1',3',3'-trimethylspiro[2H-1-benzopyran-2,2'-indoline]; 5'-chloro-8-ethoxy-1',3',3'-trimethylspiro[2H-1-benzopyran-2,2'-indoline]; 6-chloro-8-ethoxy-1',3',3'-trimethylspiro[2H-1-benzopyran-2,2'-indoline]; 5'-chloro-8-fluoro-6-nitro-1',3',3'-trimethylspiro[2H-1-benzopyran-2,2'-indoline]; 5'-chloro-8-fluoro-1',3',3'-trimethylspiro[2H-1-benzopyran-2,2'-indoline]; 5'-chloro-6-formyl-1',3',3'-trimethylspiro[2H-1-benzopyran-2,2'-indoline]; 5'-chloro-6-hydroxy-8-methoxy-1',3',3'-trimethylspiro[2H-1-benzopyran-2,2'-indoline]; 5'-chloro-6-iodo-8-nitro-1',3',3'-trimethylspiro[2H-1-benzopyran-2,2'-indoline]; 5'-chloro-8-iodo-6-nitro-1',3',3'-trimethylspiro[2H-1-benzopyran-2,2'-indoline]; 5'-chloro-7-methoxy-6-nitro-1',3',3',5-tetramethylspiro[2H-1-benzopyran-2,2'-indoline]; 5-chloro-8-methoxy-6-nitro-1',3',3'-trimethylspiro[2H-1-benzopyran-2,2'-indoline]; 5'-chloro-6-methoxy-8-nitro-1',3',3'-trimethylspiro[2H-1-benzopyran-2,2'-indoline]; 5'-chloro-7-methoxy-6-nitro-1',3',3'-trimethylspiro[2H-1-benzopyran-2,2'-indoline]; 5'-chloro-8-methoxy-5-nitro-1',3',3'-trimethyl spiro[2H-1-benzopyran-2,2'-indoline]; 5'-chloro-8-methoxy-6-nitro-1',3',3'-trimethylspiro[2H-1-benzopyran-2,2'-indoline]; 6-chloro-5'-methoxy-8-nitro-1',3',3'-trimethylspiro[2H-1-benzopyran-2,2'-indoline]; 7'-chloro-6-methoxy-8-nitro-1',3',3'-trimethylspiro[2H-1-benzopyran-2, 2'-indoline]; 7'-chloro-8-methoxy-6-nitro-1',3',3'-trimethylspiro[2H-1-benzopyran-2,2'-indoline]; 5'-chloro-6-methoxy-1',3',3'-trimethylspiro[2H-1-benzopyran-2,2'-indoline]; 5-chloro-8-methoxy-1',3',3'-trimethylspiro[2H-1-benzopyran-2,2'-indoline]; 5'-chloro-8-methoxy-1',3',3'-trimethylspiro[2H-1-benzopyran-2,2'-indoline]; 6-chloro-5'-methoxy-1',3',3'-trimethylspiro[2H-1-benzopyran-2,2'-indoline]; 6-chloro-8-methoxy-1',3',3'-trimethylspiro[2H-1-benzopyran-2,2'-indoline]; 7-chloro-7'-methoxy-1',3',3'-trimethylspiro[2H-1-benzopyran-2,2'-indoline]; 7-chloro-7'-methoxy-1',3',4'-trimethylspiro[2H-1-benzopyran-2,2'-indoline]; 5'-chloro-8-methoxy-1',3',3'-trimethyl-5,6,6'-trinitrospiro[2H-1-benzopyran-2,2'-indoline]; 5'-chloro-6-nitro-1',3',3',5,7-pentamethylspiro[2H-1-benzopyran-2,2'-indoline]; 5'-chloro-6-nitro-1',3',3',5,8-pentamethylspiro[2H-1-benzopyran-2,2'-indoline]; 6-chloro-8-nitro-1',3',3',5,7-pentamethylspiro[2H-1-benzopyran-2,2'-indoline]; 7-chloro-6-nitro-1',3,3',3'-tetramethylspiro[2H-1-benzopyran-2,2'-indoline]; 4'-chloro-6-nitro-1',3',3'-trimethylspiro[2H-1-benzopyran-2,2'-indoline]; 5-chloro-6-nitro-1',3',3'-trimethylspiro[2H-1-benzopyran-2,2'-indoline]; 5'-chloro-6-nitro-1',3',3'-trimethylspiro[2H-1-benzopyran-2,2'-indoilne]; 5'-chloro-8-nitro-1',3',3'-trimethylspiro[2H-1-benzopyran-2,2'-indoline]; 6'-chloro-6-nitro-1',3',3'-trimethylspiro[2H-1-benzopyran-2,2'-indoline]; 6-chloro-8-nitro-1',3',3'-trimethylspiro[2H-1-benzopyran-2,2'-indoline]; 7-chloro-6-nitro-1',3',3'-trimethylspiro[2H-1-benzopyran-2,2'-indoline]; 7'-chloro-6-nitro-1',3',3'-trimethylspiro[2H-1-benzopyran-2,2'-indoline]; 7-chloro-8-nitro-1',3',3'-trimethylspiro[2H-1-benzopyran-2,2'-indoline]; 8-chloro-6-nitro-1',3',3'-trimethylspiro[2H-1-benzopyran-2,2'-indoline]; 5'-chloro-6-(β-nitrovinyl)-1',3',3'-trimethylspiro[2H-1-benzopyran-2,2'-indoline]; 5'-chloro-1',3',3',5,7-pentamethylspiro[2H-1-benzopyran-2,2'-indoline]; 6-chloro-4',7',8-trimethoxy-1',3',3'-trimethylspiro[2H-1-benzopyran-2,2'-indoline]; 5-chloro-1',3',3'-trimethylspiro[2H-1-benzopyran-2,2'-indoline]; 5'-chloro-1',3',3'-trimethylspiro[2H-1-benzopyran-2,2'-indoline]; 6-chloro-1',3',3'-trimethylspiro[2H-1-benzopyran-2,2'-indoline]; 7-chloro-1',3',3'-trimethylspiro[2H-1-benzopyran-2,2'-indoline]; 8-chloro-1',3',3'-trimethylspiro[2H-1-benzopyran-2,2'-indoline]; 6-cyano-1',3',3'-trimethylspiro[2H-1-benzopyran-2,2'-indoline]; 6,8-diallyl-1',3',3'-trimethylspiro[2H-1-benzopyran-2,2'-indoline]; 5,6-dibromo-8-methoxy-1',3',3'-trimethylspiro[2H-1-benzopyran-2,2'-indoline]; 6,8-dibromo-5'-methoxy-1',3',3'-trimethylspiro[2H-1-benzopyran-2,2'-indoline]; 6,8-dibromo-5-nitro-1',3',3'-trimethylspiro[2H-1-benzopyran-2,2'-indoline]; 6,8-dibromo-1',3',3'-trimethylspiro[2H-1-benzopyran-2,2'-indoline]; 4',7'-dichloro-5,7-dimethoxy-6-nitro-1',3',3'-trimethylspiro[2H-1-benzopyran-2,2'-indoline]; 5',8-dichloro-5,7-dimethoxy-6-nitro-1',3',3'-trimethylspiro[2H-1-benzopyran-2,2'-indoline]; 5,6-dichloro-3',3'-dimethyl-8-ethoxy-1'-phenylspiro[2H-1-benzopyran-2,2'-indoline]; 5,7-dichloro-1',3'-dimethyl-6-nitro-3'-phenylspiro[2H-1-benzopyran-2,2'-indoline]; 5,7-dichloro-3',3'-dimethyl-6-nitro-1'-phenylspiro[2H-1-benzopyran-2,2'-indoline]; 4',7'-dichloro-5,6-dinitro-8-methoxy-1',3',3'-trimethylspiro[2H-1-benzopyran-2,2'-indoline]; 4',7'-dichloro-7,8-dinitro-6-methoxy-1',3',3'-trimethylspiro[2H-1-benzopyran-2,2'-indoline]; 5,7-dichloro-5',6-dinitro-1',3',3'-trimethylspiro[2H-1-benzopyran-2,2'-indoline]; 5,7-dichloro-4',6'-diphenyl-6-nitro-1',3',3'-trimethylspiro[2H-1-benzopyran-2,2'-indoline]; 5,6-dichloro-8-ethoxy-1',3',3'-trimethylspiro[2H-1-benzopyran-2,2'-indoline]; 4',7'-dichloro-8-methoxy-6-nitro-1',3',3'-trimethylspiro[2H-1-benzopyran-2,2'- indoline]; 5,7-dichloro-5'-methoxy-6-nitro-1',3',3'-trimethylspiro[2H-1-benzopyran-2,2'-indoline]; 5,7-dichloro-7'-methoxy-6-nitro-1',3',3'-trimethylspiro[2H-1-benzopyran-2,2'-indoline]; 4',7'-dichloro-8-methoxy-1',3',3'-trimethylspiro[2H-1-benzopyran-1-benzopyran-2,2'-indoline]; 5,6-dichloro-8-methoxy-1',3',3'-trimethylspiro[2H-1-benzopyran-2,2'-indoline]; 5',6-dichloro-8-methoxy-1',3',3'-trimethylspiro[2H-1-benzopyran-2,2'-indoline]; 6,7'-dichloro-8-methoxy-1',3',3'-trimethylspiro[2H-1-benzopyran-2,2'-indoline]; 5,7-dichloro-6-nitro-1',3',3',4',7'-pentamethylspiro[2H-1-benzopyran-2,2'-indoline]; 5,7-dichloro-6-nitro-1',3',3',5',7'-pentamethylspiro[2H-1-benzopyran-2,2'-indoline]; 5,7-dichloro-6-nitro-7'-phenyl-1',3',3'-trimethylspiro[2H -1-benzopyran-2,2'-indoline]; 5,7-dichloro-6-nitro-4',5',6',7'-tetrafluoro-1',3',3'-trimethylspiro[2H-1-benzopyran-2,2'-indoline]; 4',6'-dichloro-6-nitro-1',3',3'-trimethylspiro[2H-1-benzopyran-2,2'-indoline]; 4',7'-dichloro-6-nitro-1',3',3'-trimethylspiro[2H-1-benzopyran-2,2'-indoline]; 5,7-dichloro-6-nitro-1',3',3',5'-tetramethylspiro[2H-1-benzopyran-2,2'-indoline]; 5,5'-dichloro-6-nitro-1',3',3'-trimethylspiro[2H-1-benzopyran-2,2'-indoline]; 5',6-dichloro-8-nitro-1',3',3'-trimethylspiro[2H-1-benzopyran-2,2'-indoline]; 5,7-dichloro-6-nitro-1',3',3'-trimethylspiro[2H-1-benzopyran-2,2'-indoline]; 5,8-dichloro-6-nitro-1',3',3'-trimethylspiro[2H-1-benzopyran-2,2'-indoline]; 5',7'-dichloro-6-nitro-1',3',3'-trimethylspiro[2H-1-benzopyran-2,2'-indoline]; 5',8-dichloro-6-nitro-1',3',3'-trimethylspiro[2H-1-benzopyran-2,2'-indoline]; 6,8-dichloro-5-nitro-1,3',3'-trimethylspiro[2H-1-benzopyran-2,2'-indoline]; 7,8-dichloro-6-nitro-1',3',3'-trimethylspiro[2H-1-benzopyran-2,2'-indoline]; 5,7-dichloro-6-nitro-1',3',3'-trimethyl-4',6',7'-triphenylspiro[2H-1-benzopyran-2,2'-indoline]; 5',6-dichloro-1',3',3'-trimethylspiro[2H -1-benzopyran-2,2'-indoline]; 5,7-dichloro-1',3',3'-trimethylspiro[2H-1-benzopyran-2,2'-indoline]; 5',7'-dichloro-1',3',3'-trimethylspiro[2H-1-benzopyran-2,2'-indoline]; 6,8-dichloro-1',3',3'-trimethylspiro[2H-1-benzopyran-2,2'-indoline]; 7,8-dichloro-1',3',3'-trimethylspiro[2H-1-benzopyran-2,2'-indoline]; 4',7'-diethoxy-8-methoxy-1',3',3'-trimethylspiro[2H-1-benzopyran-2,2'-indoline]; 3',3'-diethyl-6-methoxy-1'-methyl-8-nitrospiro[2H-1-benzopyran-2,2'-indoline]; 3',3'-diethyl-8-methoxy-1'-methyl-6-nitrospiro[2H-1-benzopyran-2,2'-indoline]; 3',3'-diethyl-1'-methyl-6-nitrospiro[2H-1-benzopyran-2,2'-indoline]; 1',3'-diethyl-3'-methyl-4',7',8'-trimethoxyspiro[2H-1-benzopyran-2,2'-indoline]; 7-diethylamino-1',3',3'-trimethylspiro[2H-1-benzopyran-2,2'-indoline]; 5,7-dihydroxy-1',3',3'-trimethylspiro[2H-1-benzopyran-2,2'-indoline]; 6,8-diiodo-1',3',3'-trimethylspiro[2H-1-benzopyran-2,2'-indoline]; 5',8-dimethoxy3',3'-dimethyl-1'-ethylspiro[2H-1-benzopyran-2,2'-indoline]; 5,7-dimethoxy-3',3'-dimethyl-5',6-dinitro-1'-isoamylspiro[2H-1-benzopyran-2,2'-indoline]; 5,7-dimethoxy-1',3'-dimethyl-6-nitro-3'-phenylspiro[2H-1-benzopyran-2,2'-indoline]; 5,7-dimethoxy-3',3'-dimethyl-6-nitro-1'-phenylspiro[2H-1-benzopyran-2,2'-indoline]; 1',8-dimethoxy-5,6-dinitro-3'-methyl-3'-phenylspiro[2H-1-benzopyran-2,2'-indoline]; 4',7'-dimethoxy-6,8-dinitro-1',3',3'-trimethylspiro[2H-1-benzopyran-2,2'-indoline]; 5,7-dimethoxy-6,8-dinitro-1',3',3'-trimethylspiro[2H-1-benzopyran-2,2'-indoline]; 5',8-dimethoxy-5,6-dinitro-1',3',3'-trimethylspiro[2H-1-benzopyran-2,2'-indoline]; 6',8-dimethoxy-5,6-dinitro-1',3',3'-trimethylspiro[2H-1-benzopyran-2,2'-indoline]; 7',8-dimethoxy-5,6-dinitro-1',3',3'-trimethylspiro[2H-1-benzopyran-2,2'-indoline]; 4',7'-dimethoxy-8-ethoxy-1',3',3'-trimethylspiro[2H-1-benzopyran-2,2'-indoline]; 5',7'-dimethoxy-8-ethoxy-1',3',3'-trimethylspiro[2H-1-benzopyran-2,2'-indoline]; 5,7-dimethoxy-4'-fluoro-6-nitro-1',3',3'-trimethylspiro[2H-1-benzopyran-2,2'-indoline]; 5,7-dimethoxy-5'-fluoro-6-nitro-1',3',3'-trimethylspiro[2H-1-benzopyran-2,2'-indoline]; 1',8-dimethoxy-3'-methyl-6-nitro-3'-phenylspiro[2H-1-benzopyran-2,2'-indoline]; 5,7-dimethoxy-6-nitro-7'-phenyl-1',3',3'-trimethylspiro[2H-1-benzopyran-2,2'-indoline]; 4',7'-dimethoxy-6-nitro-1',3',3'-trimethylspiro[2H-1-benzopyran-2,2'-indoline]; 4',7'-dimethoxy-8-nitro-1',3',3'-trimethylspiro[2H-1-benzopyran-2,2'-indoline]; 5',6-dimethoxy-8-nitro-1',3',3'-trimethylspiro[2H-1-benzopyran-2,2'-indoline]; 5,7-dimethoxy-6-nitro-1',3',3'-trimethylspiro[2H-1-benzopyran-2,2'-indoline]; 5',8-dimethoxy-5-nitro-1',3',3'-trimethylspiro[2H-1-benzopyran-2,2'-indoline]; 5',8-dimethoxy-6-nitro-1',3',3'-trimethylspiro[2H-1-benzopyran-2,2'-indoline]; 6,7'-dimethoxy-8-nitro-1',3',3'-trimethylspiro[2H-1-benzopyran-2,2'-indoline]; 7',8-dimethoxy-5-nitro-1',3',3'-trimethylspiro[2H-1-benzopyran-2,2'-indoline]; 7',8-dimethoxy-6-nitro-1',3',3'-trimethylspiro[2H-1-benzopyran-2,2'-indoline]; 5,7-dimethoxy-6-nitro-1',3',3'-trimethyl-4',6',7'-triphenylspiro[2H-1-benzopyran-2,2'-indoline]; 5,7-dimethoxy-1',3',3'-trimethylspiro[2H-1-benzopyran-2,2'-indoline]; 5',8-dimethoxy-1',3',3'-tritrimethylspiro[2H-1-benzopyran-2,2'-indoline]; 7',8-dimethoxy-1',3',3'-trimethylspiro[2H-1-benzopyran-2,2'-indoline]; 1',3'-dimethyl-6,8-dinitro-3'-ethylspiro[2H-1-benzopyran-2,2'-indoline]; 3',3'-dimethyl-6,8-dinitro-1'-ethylspiro[2H-1-benzopyran-2,2'-indoline]; 3',3'-dimethyl-5,6-dinitro-1'-hexadecyl-8-methoxyspiro[2H-1-benzopyran-2,2'-indoline]; 3',3'-dimethyl-6,8-dinitro-1'-isoamylspiro[2H-1-benzopyran-2,2'-indoline]; 3',3'-dimethyl-5,6-dinitro-1'-isoamyl-8-methoxyspiro[2H-1-benzopyran-2,2'-indoline]; 3',3'-dimethyl-6,8-dinitro-1'-isoamyl-7-methoxyspiro[2H-1-benzopyran-2,2'-indoline]; 1',3'-dimethyl-5,6-dinitro-8-methoxy-3'-phenylspiro[2H-1-benzopyran-2,2'-indoline]; 1',3'-dimethyl-5',6-dinitro-8-methoxy-3'-phenylspiro[2H-1-benzopyran-2,2'-indoline]; 3,3'-dimethyl-5,6-dinitro-8-methoxy-1'-phenylspiro[2H-1-benzopyran-2,2'-indoline]; 3,3'-dimethyl-6,8-dinitro-7-methoxy-1'-phenylspiro[2H-1-benzopyran-2,2'-indoline]; 3',3'-dimethyl-7,8-dinitro-6-methoxy-1'-phenylspiro[2H-1-benzopyran-2,2'-indoline]; 1',3'-dimethyl-6,8-dinitro-3'-phenylspiro[2H-1-benzopyran-2,2'-indoline]; 3',3'-dimethyl-6,8-dinitro-1'-phenylspiro[2H-1-benzopyran-2,2'-indoline]; 3',3'-dimethyl-6,8-dinitro-1'-propylspiro[2H-1-benzopyran-2,2'-indoline]; 1',3'-dimethyl-3',7'-diphenyl-8-methoxy-6-nitrospiro[2H-1-benzopyran-2,2'-indoline]; 3',3'-dimethyl-8-ethoxy-1'-phenylspiro[2H-1-benzopyran-2,2'-indoline]; 1',3'-dimethyl-3'-ethylspiro[2H-1-benzopyran-2,2'-indoline]; 3',3'-dimethyl-1'-ethylspiro[2H-1-benzopyran-2,2'-indoline]; 1',3'-dimethyl-3'-ethyl-8-methoxyspiro[2H-1-benzopyran-2,2'-indoline]; 3',3'-dimethyl-1'-ethyl-8-methoxyspiro[2H-1-benzopyran-2,2'-indoline]; 1',3'-dimethyl-3'-ethyl-6-methoxy-8-nitrospiro[2H-1-benzopyran-2,2'-indoline]; 1',3'-dimethyl-3'-ethyl-8-methoxy-5-nitrospiro[2H-1-benzopyran-2,2'-indoline]; 1',3'-dimethyl-3'-ethyl-8-methoxy-6-nitrospiro[2H-1-benzopyran-2,2'-indoline]; 3',3'-dimethyl-1'-ethyl-8-methoxy-6-nitrospiro[2H-1-benzopyran-2,2'-indoline]; 1',3'-dimethyl-3'-ethyl-6-nitrospiro[2H-1-benzopyran-2,2'-indoline]; 3',3'-dimethyl-1'-ethyl-6-nitrospiro[2H-1-benzopyran-2,2'-indoline]; 3',3'-dimethyl-1'-ethyl-8-nitrospiro[2H-1-benzopyran-2,2'-indoline]; 3',3'-dimethyl-1'-hexadecyl-6-nitrospiro[2H-1-benzopyran-2,2'-indoline]; 3',3'-dimethyl-1'-((β-hydroxyethyl)-6-nitrospiro[2H-1-benzopyran-2,2'-indoline]; 3,3'-dimethyl-1'-isoamyl-8-methoxy-5,5',6-trinitrospiro[2H-1-benzopyran-2,2'-indoline]; 3',3'-dimethyl-1'-isoamyl-6-nitrospiro[2H-1- benzopyran-2,2'-indoline]; 3',3'-dimethyl-1'-isoamyl-5',6,8-trinitrospiro[2H-1-benzopyran-2,2'-indoline]; 3',3'-dimethyl-1'-isopropyl-8-methoxy-6-nitrospiro[2H-1-benzopyran-2,2'-indoline]; 1',3'-dimethyl-6-methoxy-8-nitro-3'-phenylspiro[2H-1-benzopyran-2,2'-indoline]; 1',3'-dimethyl-8-methoxy-6-nitro-3'-phenylspiro[2H-1-benzopyran-2,2'-indoline]; 3',3'-dimethyl-6-methoxy-8-nitro-1'-phenylspiro[2H-1-benzopyran-2,2'-indoline]; 3',3'-dimethyl-7-methoxy-6-nitro-1'-phenylspiro[2H-1-benzopyran-2,2'-indoline]; 3',3'-dimethyl-8-methoxy-5-nitro-1'-phenylspiro[2H-1-benzopyran-2,2'-indoline]; 3',3'-dimethyl-8-methoxy-6-nitro-1'-phenylspiro[2H-1-benzopyran-2,2'-indoline]; 3',3'-dimethyl-8-methoxy-6-nitro-1'-propylspiro[2H-1-benzopyran-2,2'-indoline]; 1',3'-dimethyl-8-methoxy-3'-phenylspiro[2H-1-benzopyran-2,2'-indoline]; 3',3'-dimethyl-8-methoxy-1'-phenylspiro[2H-1-benzopyran-2,2'-indoline]; 3',3'-dimethyl-8-methoxy-1'-propylspiro[2H-1-benzopyran-2,2'-indoline]; 1',3'-dimethyl-6-nitro-3'-phenylspiro[2H-1-benzopyran-2,2'-indoline]; 1',3'-dimethyl-8-nitro-3'-phenylspiro[2H-1-benzopyran-2,2'-indoline]; 3',3'-dimethyl-6-nitro-1'-phenylspiro[2H-1-benzopyran-2,2'-indoline]; 3',3'-dimethyl-1'-phenylspiro[2H-1-benzopyran-2,2'-indoline]; 3',3'-dimethyl-1'-propylspiro[2H-1-benzopyran-2,2'-indoline]; 1'-dimethylamino-5,6-dinitro-8-methoxy-3'-methyl-3'-phenylspiro[2H-1-benzopyran-2,2'-indoline]; 1'-dimethylamino-8-methoxy-3'-methyl-6-nitro-3'-phenylspiro[2H-1-benzopyran-2,2'-indoline]; 1'-dimethylamino-3'-methyl-6-nitro-3'-phenylspiro[2H-1-benzopyran-2,2'-indoline]; 5,6-dinitro-8-methoxy-1',3',3',4',7'-pentamethylspiro[2H-1-benzopyran-2,2'-indoline]; 5,6-dinitro-8-methoxy-7'-phenyl-1',3',3'-trimethylspiro[2H-1-benzopyran-2,2'-indoline]; 5,6-dinitro-8-methoxy-1',3,3',3'-tetramethylspiro[2H-1-benzopyran-2,2'-indoline]; 5,6-dinitro-8-methoxy-1',3',3',5'-tetramethylspiro[2H-1-benzopyran-2,2'-indoline]; 5,5'-dinitro-8-methoxy-1',3',3'-trimethylspiro[2H-1-benzopyran-2,2'-indoline]; 5,6-dinitro-8-methoxy-1',3',3'-trimethylspiro[2H-1-benzopyran-2,2'-indoline]; 5',8-dinitro-6-methoxy-1',3',3'-trimethylspiro[2H-1-benzopyran-2,2'-indoline]; 6,7-dinitro-8-methoxy-1',3',3'-trimethylspiro[2H-1-benzopyran-2,2'-indoline]; 6,8-dinitro-5'-methoxy-1',3',3'-trimethylspiro[2H-1-benzopyran-2,2'-indoline]; 6,8-dinitro-7-methoxy-1',3',3'-trimethylspiro[2H-1-benzopyran-2,2'-indoline]; 5,6-dinitro-8-methoxy-1',3',3'-trimethyl-4',6',7'-triphenylspiro[2H-1-benzopyran-2,2'-indoline]; 6,8-dinitro-5'-phenyl-1',3',3'-trimethylspiro[2H-1-benzopyran-2,2'-indoline]; 6,8-dinitro-1',3,3',3'-tetramethylspiro[2H-1-benzopyran-2,2'-indoline]; 6,8-dinitro-1',3',3',7'-tetramethylspiro[2H-1-benzopyran-2,2'-indoline]; 5',6-dinitro-1',3',3'-trimethylspiro[2H-1-benzopyran-2,2'-indoline]; 6,8-dinitro-1',3',3'-trimethylspiro[2H-1-benzopyran-2,2'-indoline]; 4',6'-diphenyl-8-methoxy-6-nitro-1',3',3'-trimethylspiro[2H-1-benzopyran-2,2'-indoline]; 3',3'-diphenyl-1'-methyl-6-nitrospiro[2H-1-benzopyran-2,2'-indoline]; 4',6-diphenyl-6-nitro-1',3',3'-trimethylspiro[2H-1-benzopyran-2,2'-indoline]; 5',7'-diphenyl-6-nitro-1',3',3'-trimethylspiro[2H-1-benzopyran-2,2'-indoline]; 6-ethoxy-8-nitro-1',3',3'-trimethylspiro[2H-1-benzopyran-2,2'-indoline]; 8-ethoxy-6-nitro-1',3',3'-trimethylspiro[2H-1-benzopyran-2,2'-indoline]; 8-ethoxy-1',3',3',4',7'-pentamethylspiro[2H-1-benzopyran-2,2'-indoline]; 8-ethoxy-5'-phenyl-1',3',3'-trimethylspiro[2H-1-benzopyran-2,2'-indoline]; 8-ethoxy-7'-phenyl-1',3',3'-trimethylspiro[2H-1-benzopyran-2,2'-indoline]; 8-ethoxy-1',3',3'-trimethylspiro[2H-1-benzopyran-2,2'-indoline]; 8-ethoxymethyl-6-nitro-1',3',3'-trimethylspiro[2H-1-benzopyran-2,2'-indoline]; 3'-ethyl-8-methoxy-3'-methyl-1'-phenylspiro[2H-1-benzopyran-2,2'-indoline]; 3'-ethyl-3'-methyl-6-nitro-1'-phenylspiro[2H-1-benzopyran-2,2'-indoline]; 8-ethyl-6-nitro-1',3',3'-trimethylspiro[2H-1-benzopyran-2,2'-indoline]; 4'-fluoro-8-methoxy-6-nitro-1',3',3'-trimethylspiro[2H-1-benzopyran-2,2'-indoline]; 5'-fluoro-6-methoxy-8-nitro-1',3',3'-trimethylspiro[2H-1-benzopyran-2,2'-indoline]; 5'-fluoro-8-methoxy-6-nitro-1',3',3'-trimethylspiro[2H-1-benzopyran-2,2'-indoline]; 4'-fluoro-6-nitro-1',3',3'-trimethylspiro[2H-1-benzopyran-2,2'-indoline]; 5'-fluoro-6-nitro-1',3',3'-trimethylspiro[2H-1-benzopyran-2,2'-indoline]; 6-fluoro-8-nitro-1',3',3'-trimethylspiro[2H-1-benzopyran-2,2'-indoline]; 8-fluoro-6-nitro-1',3',3'-trimethylspiro[2H-1-benzopyran-2,2'-indoline]; 7-fluoro-1',3',3'-trimethylspiro[2H-1-benzopyran-2,2'-indoline]; 8-fluoro-1',3',3'-trimethylspiro[2H-1-benzopyran-2,2'-indoline]; 8-Formyl-7-hydroxy-1',3',3'-trimethylspiro[2H-1-benzopyran-2,2'-indoline]; 6-formyl-8-methoxy-1',3',3'-trimethylspiro[2H-1-benzopyran-2,2'-indoline]; 6-formyl-1',3',3'-trimethylspiro[2H-1-benzopyran-2,2'-indoline]; 8-formyl-1',3',3'-trimethylspiro[2H-1-benzopyran-2,2'-indoline]; 1',3',3',5,5',7-hexamethyl-6-nitrospiro[2H-1-benzopyran-2,2'-indoline]; 1',3',3',5,7,8-hexamethyl-6-nitrospiro[2H-1-benzopyran-2,2'-indoline]; 5'-(β-hydroxyethyl)-8-methoxy-6-nitro-1',3',3'-trimethylspiro[2H-1-benzopyran-2,2'-indoline]; 5'-(β-hydroxyethyl)-8-methoxy-1',3',3'-trimethylspiro[2H-1-benzopyran-2,2'-indoline]; 5'-(β-hydroxyethyl)-6-nitro-1',3',3'-trimethylspiro[2H-1-benzopyran-2,2'-indoline]; 5'-(β-Hydroxyethyl)-1',3',3'-trimethylspiro[2H-1-benzopyran-2,2'-indoline]; 6-hydroxy-8-methoxy-1',3',3'-trimethylspiro[2H-1-benzopyran-2,2'-indoline]; 7-hydroxy-5'-nitro-1',3',3'-trimethylspiro[2H-1-benzopyran-2,2'-indoline]; 7-hydroxy-6-nitro-1',3',3'-trimethylspiro[2H-1-benzopyran-2,2'-indoline]; 6-hydroxy-1',3',3'-trimethylspiro[2H-1-benzopyran-2,2'-indoline]; 7-hydroxy-1',3',3'-trimethylspiro[2H-1-benzopyran-2,2'-indoline]; 8-hydroxy-1',3',3'-trimethylspiro[2H-1-benzopyran-2,2'-indoline]; 8-hydroxymethyl-6-nitro-1',3',3'-trimethylspiro[2H-1-benzopyran-2,2'-indoline]; 6-iodo-8-nitro-1',3',3'-trimethylspiro[2H-1-benzopyran-2,2'-indoline]; 8-iodo-6-nitro-1',3',3'-trimethylspiro[2H-1-benzopyran-2,2'-indoline]; 1'-methoxy-3'-methyl-6-nitro-3'-phenylspiro[2H-1-benzopyran-2,2'-indoline]; 5'-methoxy-6-nitro-1',3',3',5,7-pentamethylspiro[2H-1-benzopyran-2,2'-indoline]; 5'-methoxy-6-nitro-1',3',3',5,8-pentamethylspiro[2H-1-benzopyran-2,2'-indoline]; 7'-methoxy-6-nitro-1',3',3',5,7-pentamethylspiro[2H-1-benzopyran-2,2'-indoline]; 7'-methoxy-6-nitro-1',3',3',5,8-pentamethylspiro[2H-1-benzopyran-2,2'-indoline]; 6-methoxy-8-nitro-5'-phenyl-1',3',3'-trimethylspiro[2H-1-benzopyran-2,2'-indoline]; 6-methoxy-8-nitro-7'-phenyl-1',3',3'-trimethylspiro[2H-1-benzopyran-2,2'-indoline]; 7-methoxy-6-nitro-7'-phenyl-1',3',3'-trimethylspiro[2H-1-benzopyran-2,2'-indoline]; 8-methoxy-5-nitro-5'-phenyl-1',3',3'-trimethylspiro[2H-1-benzopyran-2,2'-indoline]; 8-methoxy-5-nitro-7'-phenyl-1',3',3'-trimethylspiro[2H-1-benzopyran-2,2'-indoline]; 8-methoxy-6-nitro-3-phenyl-1',3',3'-trimethylspiro[2H-1-benzopyran-2,2'-indoline]; 8-methoxy-6-nitro-5'-phenyl-1',3',3'-trimethylspiro[2H-1-benzopyran-2,2'-indoline]; 8-methoxy-6-nitro-7'-phenyl-1',3',3'-trimethylspiro[2H-1-benzopyran-2,2'-indoline]; 6-methoxy-8-nitro-1',3,3',3'-tetramethylspiro[2H-1-benzopyran-2,2'-indoline]; 6-methoxy-8-nitro-1',3',3',5'-tetramethylspiro[2H-1-benzopyran-2,2'-indoline]; 6-methoxy-8-nitro-1',3',3',6'-tetramethylspiro[2H-1-benzopyran-2,2'-indoline]; 6-methoxy-8-nitro-1',3',3',7'-tetramethylspiro[2H-1-benzopyran-2,2'-indoline]; 7-methoxy-6-nitro-1',3,3',3'- tetramethylspiro[2H-1-benzopyran-2,2'-indoline]; 7-methoxy-6-nitro-1',3',3'5'-tetramethylspiro[2H-1-benzopyran-2,2'-indoline]; 8-methoxy-5-nitro-1',3,3',3'-tetramethylspiro[2H-1-benzopyran-2,2'-indoline]; 8-methoxy-5-nitro-1',3',3',6'-tetramethylspiro[2H-1-benzopyran-2,2'-indoline]; 8-methoxy-5-nitro-1',3',3',7'-tetramethylspiro[2H-1-benzopyran-2,2'-indoline]; 8-methoxy-6-nitro-1',3,3',3'-tetramethylspiro[2H-1-benzopyran-2,2'-indoline]; 8-methoxy-6-nitro-1',3',3',4'-tetramethylspiro[2H-1-benzopyran-2,2'-indoline]; 8-methoxy-6-nitro-1',3',3',5'-tetramethylspiro[2H-1-benzopyran-2,2'-indoline]; 8-methoxy-6-nitro-1',3',3',6'-tetramethylspiro[2H-1-benzopyran-2,2'-indoline]; 8-methoxy-6-nitro-1',3',3',7'-tetramethylspiro[2H-1-benzopyran-2,2'-indoline]; 8-methoxy-6-nitro-1',3',3'-triethylspiro[2H-1-benzopyran-2,2'-indoline]; 5'-methoxy-6-nitro-1',3',3'-trimethylspiro[2H-1-benzopyran-2,2'-indoline]; 5'-methoxy-8-nitro-1',3',3'-trimethylspiro[2H-1-benzopyran-2,2'-indoline]; 6-methoxy-8-nitro-1',3',3'-trimethylspiro[2H-1-benzopyran-2,2'-indoline]; 7-methoxy-6-nitro-1',3',3'-trimethylspiro[2H-1-benzopyran-2,2'-indoline]; 7-methoxy-6-nitro-1',3',3'-trimethylspiro[2H-1-benzopyran- 2,2'-indoline]; 7'-methoxy-8-nitro-1',3',3'-trimethylspiro[2H-1-benzopyran-2,2'-indoline]; 8-methoxy-5-nitro-1',3',3'-trimethylspiro[2H-1-benzopyran-2,2'-indoline]; 8-methoxy-5'-nitro-1',3',3'-trimethylspiro[2H-1-benzopyran-2,2'-indoline]; 8-methoxy-6-nitro-1',3',3'-trimethylspiro[2H-1-benzopyran-2,2'-indoline]; 7-methoxy-6-nitro-1',3',3'-trimethyl-4',6',7'-triphenylspiro[2H-1-benzopyran-2,2'-indoline]; 8-methoxy-6-nitro-1',3',3'-trimethyl-4',6',7'-triphenylspiro[2H-1-benzopyran-2,2'-indoline]; 8-methoxy-1',3',3',4',7'-pentamethylspiro[2H-1-benzopyran-2,2'-indoline]; 8-methoxy-5'-phenyl-1',3',3'-trimethylspiro[2H-1-benzopyran-2,2'-indoline]; 8-methoxy-7'-phenyl-1',3',3'-trimethylspiro[2H-1-benzopyran-2,2'-indoline]; 8-methoxy-1',3,3',3'-tetramethylspiro[2H-1-benzopyran-2,2'-indoline]; 8-methoxy-4',6,7'-trichloro-1',3',3'-trimethylspiro[2H-1-benzopyran-2,2'-indoline]; 5'-methoxy-1',3',3'-trimethylspiro[2H-1-benzopyran-2,2'-indoline]; 6-methoxy-1',3',3'-trimethylspiro[2H-1-benzopyran-2,2'-indoline]; 7-methoxy-1',3',3'-trimethylspiro[2H-1-benzopyran-2,2'-indoline]; 8-methoxy-1',3',3'-trimethylspiro[2H-1-benzopyran-2,2'-indoline]; 8-methoxy-1',3',3'-trimethyl-5,5',6-trinitrospiro[2H-1-benzopyran-2,2'-indoline]; 6-nitro-1',3',3',5,7-pentamethylspiro[2H-1-benzopyran-2,2'-indoline]; 6-nitro-1',3',3',5,8-pentamethylspiro[2H-1-benzopyran-2,2'-indoline]; 6-(o-nitrophenylazo)-1',3',3'-trimethylspiro[2H-1-benzopyran-2,2'-indoline]; 6-(p-nitrophenylazo)-1',3',3'-trimethylspiro[2H-1-benzopyran-2,2'-indoline]; 6-nitro-5'-phenyl-1',3',3'-trimethylspiro[2H-1-benzopyran-2,2'-indoline]; 6-nitro-7'-phenyl-1',3',3'-trimethylspiro[2H-1-benzopyran-2,2'-indoline]; 8-nitro-5'-phenyl-1',3',3'-trimethylspiro[2H-1-benzopyran-2,2'-indoline]; 8-nitro-7'-phenyl-1',3',3'-trimethylspiro[2H-1-benzopyran-2,2'-indoline]; 6-nitro-8-piperidinomethyl-1',3',3'-trimethylspiro[2H-1-benzopyran-2,2'-indoline]; 7-nitro-5,5',6,8-tetrachloro-1',3',3'-trimethylspiro[2H-1-benzopyran-2,2'-indoline]; 6-nitro-4', 5',6',7'-tetrafluoro-1',3',3'-trimethylspiro[2H-1-benzopyran-2,2'-indoline]; 6-nitro-1',3,3',3'-tetramethylspiro[2H-1-benzopyran-2,2'-indoline]; 6-nitro-1',3',3',5'-tetramethylspiro[2H-1-benzopyran-2,2'-indoline]; 6-nitro-1',3',3',6'-tetramethylspiro[2H-1-benzopyran-2,2'-indoline]; 6-nitro-1',3',3',7'-tetramethylspiro[2H-1-benzopyran-2,2'-indoline]; 6-nitro-1',3',3',8-tetramethylspiro[2H-1-benzopyran-2,2'-indoline]; 8-nitro-1',3,3',3'-tetramethylspiro[2H-1-benzopyran-2,2'-indoline]; 8-nitro-1',3',3',6'-tetramethylspiro[2H-1-benzopyran-2,2'-indoline]; 8-nitro-1',3',3',7'-tetramethylspirol[2H-1-benzopyran-2,2'-indoline]; 5-nitro-5',6,8-trichloro-1',3',3'-trimethylspiro[2H-1-benzopyran-2, 2'-indoline]; 6-nitro-5,5',7-trichloro-1',3',3'-trimethylspiro[2H-1-benzopyran-2,2'-indoline]; 6-nitro-5,5',8-trichloro-1',[2H-1-benzopyran-2,2'-indoline]; 6-nitro-5,7,7'-trichloro-1',3',3'-trimethylspiro[2H-1-benzopyran-2,2'-indoline]; 6-nitro-5',7,8-trichloro-1',3',3'-trimethylspiro[2H-1-benzopyran-2,2'-indoline]; 7-nitro-5,6,8-trichloro-1',3',3'-trimethylspiro[2H-1-benzopyran-2,2'-indoline]; 5-nitro-4',7,8-trimethoxy-1',3',3'-trimethylspiro[2H-1-benzopyran-2,2'-indoline]; 6-nitro-4',6',8-trimethoxy-1',3',3'-trimethylspiro[2H-1-benzopyran-2,2'-indoline]; 6-nitro-4',7,8-trimethoxy-1',3',3'-trimethylspiro[2H-1-benzopyran-2,2'-indoline]; 8-nitro-4',6,7'-trimethoxy-1',3',3'-trimethylspiro[2H-1-benzopyran-2,2'-indoline]; 5-nitro-1',3',3'-trimethylspiro[2H-1-benzopyran-2,2'-indoline]; 5'-nitro-1',3',3'-trimethylspiro[2H-1-benzopyran-2,2'-indoline]; 6-nitro-1',3',3'-trimethylspiro[2H-1-benzopyran-2,2'-indoline]; 7-nitro-1',3',3'-trimethylspiro[2H-1-benzopyran-2,2'-indoline]; 8-nitro-1',3',3'-trimethylspiro[2H-1-benzopyran-2,2'-indoline]; 6-(β-nitrovinyl)-1',3',3'-trimethylspiro[2H-1-benzopyran-2,2'-indoline]; 6-nitro-1',3',3'-trimethyl-4',6',7'-triphenylspiro[2H-1-benzopyran-2,2'-indoline]; 1',3',3',5,7-pentamethylspiro[2H-1-benzopyran-2,2'-indoline]; 1',3',3',6,8-pentamethylspiro[2H-1-benzopyran-2,2'-indoline]; 7'-phenyl-1',3',3'-trimethylspiro[2H-1-benzopyran-2,2'-indoline]; 6-phenylazo-1',3',3'-trimethylspiro[2H-1-benzopyran-2,2'-indoline]; 1',3,3,3'-tetramethylspiro[2H-1-benzopyran-2,2'-indoline]; 1',3',3',5'-tetramethylspiro[2H-1-benzopyran-2,2'-indoline]; 1',3',3',6-tetramethylspiro[2H-1-benzopyran-2,2'-indoline]; 1',3'3',7'-tetramethylspiro[2H-1-benzopyran-2,2'-indoline]; 1',3',3',8-tetramethylspiro[2H-1-benzopyran-2,2'-indoline]; 5,6,8-trichloro-1',3',3'-trimethylspiro[2H-1-benzopyran-2,2'-indoline]; 4',6',8-trimethoxy-1',3',3'-trimethylspiro[2H-1-benzopyran-2,2'-indoline]; 4', 7,8-trimethoxy-1',3',3'-trimethylspiro[2H-1-benzopyran-2,2'-indoline]; 5',7',8-trimethoxy-1',3',3'-trimethylspiro[2H-1-benzopyran-2,2'-indoline]; 1',3',3'-trimethylspiro[2H-1-benzopyran-2,2'-indoline]; 1',3',3'-trimethyl-5',6,8-trinitrospiro[2H-1-benzopyran-2,2'-indoline]; 1',3',3'-trimethyl-4',6',7'-triphenylspiro[2H-1-benzopyran-2,2'-indoline]; spiro[2H-1-benzopyran-2,2'-[1H]benzo[g]indoline]; 8-methoxy-6-nitro-1',3',3'-trimethylspiro[2H-1-benzopyran-2,2'-[1H]-benzo[g]indoline]; 6-nitro-1',3',3'-trimethylspiro[2H-1-benzopyran-2,2'-[1H]-benzo[g]indoline]; spiro[2H-benzopyran-2,2,-[1H]-benzo[e]indoline]; 6-nitro-1',3',3'-trimethylspiro[2H-benzopyran-2,2,-[1H]benzo[e]indoline]; spiro[indoline-2, 3'-[3H]-naphtho[2,1-b]pyran]; 8'-bromo-1,3,3-trimethylspiro[indoline-2,3'-[3H]-naphtho[2,1-b]pyran]; 1-butyl-3,3-dimethylspiro[indoline-2,3'-[3H]-naphtho[2,1-b]pyran]; 1-butyl-3,3-dimethyl-8-nitrospiro[indoline-2,3'-[3H]-naphtho[2,1-b]pyran]; 5'-carboxy-5-chloro-1,3,3-trimethylspiro[indoline-2,3'-[3H]-naphtho[2,1-b]pyran]; 5'-carboxy-1,3,3-trimethylspiro[indoline-2,3'-[3H]-naphtho[2,1b]pyran]; 5-chloro-1,3,3-trimethylspiro[indoline-2,3'-[3H]-naphtho[2,1b]pyran]; 5-chloro-8'-nitro-1,3,3-trimethylspiro[indoline-2,3'-[3H]-naphtho[2,1-b]pyran]; 4,7-dimethoxy-1,3,3-trimethylspiro[indoline-2,3'-[3H]-naphtho[2,1-b]pyran]; 1,3-dimethyl-3-ethylspiro[indoline-2,3'-[3H]-naphtho[2,1-b]pyran]; 3,3-dimethyl-1-ethylspiro[indoline-2,3'-[3H]-naphtho[2,1-b]pyran]; 3,3-dimethyl-1-ethyl-8'-nitrospiro[indoline-2,3'-[3H]-naphtho[2,1-b]pyran]; 3,3-dimethyl-1-propylspiro[indoline-2,3'-[3H]- naphtho[2,1-b]pyran]; 3,3-dimethyl-1-propyl-8'-nitrospiro[indoline-2,3'-[3H]-naphtho[2,1-b]pyran]; 9'-hydroxy-1,3,3-trimethylspiro[indoline-2,3'-[3H]-naphtho[2,1-b]pyran]; 5-(β-hydroxyethyl)-1,3,3-trimethylspiro[indoline-2,3'-[3H]-naphtho[2,1-b]pyran]; 5-methoxy-8'-nitro-1,3,3-trimethylspiro[indoline-2,3'-[3H]-naphtho[2,1-b]pyran]; 5'-methoxy-8'-nitro-1,3,3-trimethylspiro[indoline-2,3'-[3H]-naphtho[2,1b]pyran]; 5'-methoxy-10'-nitro-1,3,3-trimethylspiro[indoline-2,3'-[3H]-naphtho[2,1-b]pyran]; 5-methoxy-1,3,3-trimethylspiro[indoline-2,3'-[3H]-naphtho[2,1-b]pyran]; 5'-methoxy-1,3,3-trimethylspiro[indoline-2,3'-[3H]-naphtho[2,1-b]pyran]; 7'-nitro-1,3,3-trimethylspiro[indoline-2,3'-[3H]-naphtho[2,1-b]pyran]; 8'-nitro-1,3,3-trimethylspiro[indoline-2,3'-[3H]-naphtho[2,1-b]pyran]; 10'-nitro-1,3,3-trimethylspiro[indoline-2,3'-[3H]-naphtho[2,1-b]pyran]; 1,3,3,4,7-pentamethylspiro[indoline-2,3'-[3H]-naphtho[2,1-b]pyran]; 1,3,3,5,7-pentamethylspiro[indoline-2,3'-[3H]-naphtho[2,1-b]pyran]; 5-phenyl-1,3,3-trimethylspiro[indoline-2,3'-[3H]-naphtho[2,1-b]pyran]; 7-phenyl-1,3,3-trimethylspiro[indoline-2,3'-[3H]-naphtho[2,1-b]pyran]; 1,2',3,3-tetramethylspiro[indoline-2,3'-[3H]-naphtho[2,1-b]pyran]; 1,3,3,5-tetramethylspiro[indoline-2,3'-[3H]-naphtho[2,1-b]pyran]; 1,3,3,7-tetramethylspiro[indoline-2,3'-[3H]-naphtho[2,1-b]pyran]; 1,3,3,-trimethylspiro[indoline-2,3'-[3H]-naphtho[2,1b]pyran]; spiro[indoline-2,2'-[2H]-phenanthro[2,1-b]pyran]; 1,3,3,-trimethylspiro[indoline-2,2'-[2H]-phenanthro[2,1-b]pyran]; spiro[3H-anthra[2,1-b]pyran-3,2'-indoline]; 1',3',3'-trimethylspiro[3H-anthra[2,1-b]pyran-3,2'-indoline]; spiro[indoline-2,3'-(3H]-phenanthro[3,4-b]pyran]; 1,3,3-trimethylspiro[indoline-2,3'-(3H]-phenanthro[3,4-b]pyran]; spiro[indoline-2,2'-[2H]-naphtho[1,2-b]pyran]; 6'-chloro-1,3,3-trimethylspiro[indoline-2,2'-[2H]-naphtho[1,2-b]pyran]; 6'-nitro-1,3,3-trimethylspiro[indoline-2,2'-[2H]-naphtho[1,2-b]pyran]; 1,3,3-trimethylspiro[indoline-2,2'-[2H]-naphtho[1,2-b]pyran]; spiro[indoline-2,2'-[2H]-naphtho[2,3-b]pyran]; 10'-nitro-1,3,3-trimethylspiro[indoline-2,2'-[2H]-naphtho[2,3-b]pyran]; 1,3,3-trimethylspiro[indoline-2,2'-[2H]-naphtho[2,3-b]pyran]; spiro[2H-1-benzopyran-2,2'-benzothiazoline]; 6'-acetamido-3,3'-dimethyl-6-nitrospiro[2H-1-benzopyran-2,2'-benzothiazoline]; 6'-amino-3,3'-dimethyl-6-nitrospiro[2H-1-benzopyran-2,2'-benzothiazoline]; 6-bromo-3,3'-dimethylspiro[2H-1-benzopyran-2,2'-benzothiazoline]; 6-bromo-3,3'-dimethyl-6'-methoxyspiro[2H-1-benzopyran-2,2'-benzothiazoline]; 6'-bromo-3,3'-dimethyl-8-methoxy-6-nitrospiro[2H-1-benzopyran-2,2'-benzothiazoline]; 6-bromo-3,3'-dimethyl-6'-methylthiospiro[2H-1-benzopyran-2,2'-benzothiazoline]; 6-bromo-3,3'-dimethyl-6'-nitrospiro[2H-1-benzopyran-2,2'-benzothiazoline]; 8-bromo-3,3'-dimethyl-6-nitrospiro[2H-1-benzopyran-2,2'-benzothiazoline]; 6-bromo-3'-methylspiro[2H-1-benzopyran-2,2'-benzothiazoline]; 3'-butyl-6-nitro-3-phenylspiro[2H-1-benzopyran-2,2'-benzothiazoline]; 8-carbethoxy-3,3'-dimethylspiro[2H-1-benzopyran-2,2'-benzothiazoline]; 8-carbethoxy-3,3'-dimethyl-6-nitrospiro[2H-1-benzopyran-2,2'-benzothiazoline]; 8-carboxy-3,3'-dimethylspiro[2H-1-benzopyran-2,2'-benzothiazoline]; 6'-carboxy-3,3'-dimethyl-8-methoxy-6-nitrospiro[2H-1-benzopyran-2,2'-benzothiazoline]; 8-carboxy-3,3'-dimethyl-6-nitrospiro[2H-1-benzopyran-2,2'-benzothiazoline]; 6'-chloro-3,3'-dimethyl-8-methoxy-6-nitrospiro[2H-1-benzopyran-2,2'-benzothiazoline]; 6-chloro-3,3'-dimethyl-8-nitrospiro[2H-1-benzopyran-2,2'-benzothiazoline]; 3-(p-chlorophenyl)-8-methoxy-3'-methyl-6-nitrospiro[2H-1-benzopyran-2,2'-benzothiazoline]; 6'-cyano-3,3'-dimethyl-8-methoxy-6-nitrospiro[2H-1-benzopyran-2,2'-benzothiazoline]; 6,6'-dibromo-3,3'-dimethylspiro[2H-1-benzopyran-2,2'-benzothiazoline]; 6',8-dimethoxy-3,3'-dimethylspiro[2H-1-benzopyran-2,2'-benzothiazoline]; 6',8-dimethoxy-3,3'-dimethyl-6,7'-dinitrospiro[2H-1-benzopyran-2,2'-benzothiazoline]; 6',8-dimethoxy-3,3'-dimethyl-6-nitrospiro[2H-1-benzopyran-2,2'-benzothiazoline]; 6',8-dimethoxy-3'-ethyl-3-methyl-6-nitrospiro[2H-1-benzopyran-2,2'-benzothiazoline]; 3,3'-dimethylspiro[2H-1-benzopyran-2,2'-benzothiazoline]; 3,3'-dimethyl-6,6'-dinitrospiro[2H-1-benzopyran-2,2'-benzothiazoline]; 3,3'-dimethyl-6,6'-dinitro-8-methoxyspiro[2H-1-benzopyran-2,2'-benzothiazoline]; 3,3'-dimethyl-6'-hydroxy-8-methoxy-6-nitrospiro[2H-1-benzopyran-2,2'-benzothiazoline]; 3,3'-dimethyl-5'-isobutyramido-6-nitrospiro[2H-1-benzopyran-2,2'-benzothiazoline]; 3,3'-dimethyl-5'-methacrylamido-6-nitrospiro[2H-1-benzopyran-2,2'-benzothiazoline]; 3,3'-dimethyl-8-methoxyspiro[2H-1-benzopyran-2,2'-benzothiazoline]; 3,3'-dimethyl-8-methoxy-6'-methylthio-6-nitrospiro[2H-1-benzopyran-2,2'-benzothiazoline]; 3,3'-dimethyl-6'-methoxy-6-nitrospiro[2H-1-benzopyran-2,2'-benzothiazoline]; 3,3'-dimethyl-8-methoxy-5-nitrospiro[2H-1-benzopyran-2,2'-benzothiazoline]; 3,3'-dimethyl-8-methoxy-6-nitrospiro[2H-1-benzopyran-2,2'-benzothiazoline]; 3,3'-dimethyl-6'-methylthio-6-nitrospiro[2H-1-benzopyran-2,2'-benzothiazoline]; 3,3'-dimethyl-6-nitrospiro[2H-1-benzopyran-2,2'-benzothiazoline]; 3,3'-dimethyl-8-nitrospiro[2H-1-benzopyran-2,2'-benzothiazoline]; 3'-ethyl-8-methoxy-3-methylspiro[2H-1-benzopyran-2,2'-benzothiazoline]; 3-ethyl-8-methoxy-3'-methyl-6-nitrospiro[2H-1-benzopyran-2,2'-benzothiazoline]; 3'-ethyl-6'-methoxy-3-methyl-6-nitrospiro[2H-1-benzopyran-2,2'-benzothiazoline]; 3'-ethyl-8-methoxy-3-methyl-6-nitrospiro[2H-1-benzopyran-2,2'-benzothiazoline]; 3-ethyl-3'-methyl-6-nitrospiro[2H-1-benzopyran-2,2'-benzothiazoline]; 3'-ethyl-3-methyl-6-nitrospiro[2H-1-benzopyran-2,2'-benzothiazoline]; 3'-ethyl-8-methoxy-6-nitro-3-phenylspiro[2H-1-benzopyran-2,2'-benzothiazoline]; 3'-ethyl-6-nitrospiro[2H-1-benzopyran-2,2'-benzothiazoline]; 3'-ethyl-6-nitro-3-phenylspiro[2H-1-benzopyran-2,2'-benzothiazoline]; 3-isopropyl-8-methoxy-3'-methyl-6-nitrospiro[2H-1-benzopyran-2,2'-benzothiazoline]; 3'-isopropyl-8-methoxy-3-methyl-6-nitrospiro[2H-1-benzopyran-2,2'-benzothiazoline]; 7-methoxy-3'-methylspiro[2H-1-benzopyran-2,2'-benzothiazoline]; 8-methoxy-3'-methyl-6-nitro-3-phenylspiro[2H-1-benzopyran-2,2'-benzothiazoline]; 8-methoxy-3'-methyl-6-nitro-3-propylspiro[2H-1-benzopyran-2,2'-benzothiazoline]; 3'-methylspiro[2H-1-benzopyran-2,2'-benzothiazoline]; 3'-methyl-6-nitrospiro[2H-1-benzopyran-2,2'-benzothiazoline]; 3'-methyl-6-nitro-3-phenylspiro[2H-1-benzopyran-2,2'-benzothiazoline]; 3'-methyl-6-nitro-3-propylspiro[2H-1-benzopyran-2,2'-benzothiazoline]; 6-nitro-3-phenyl-3'-propylspiro[2H-1-benzopyran-2,2'-benzothiazoline]; spiro[benzothiazoline-2,3,'-[3H]-naphtho[2,1-b]pyran]; 2',3-dimethylspiro[benzothiazoline-2,3,'-[3H]-naphtho[2,1-b]pyran]; 2',3-dimethyl-6-methoxyspiro[benzothiazoline-2,3,'-[3H]-naphtho[2,1-b]pyran]; 3-ethylspiro[benzothiazoline-2,3,'-[3H]-naphtho[2,1-b]pyran]; 3-ethyl-2'-methylspiro[benzothiazoline-2,3,'-[3H]-naphtho[2,1-b]pyran]; 3-methylspiro[benzothiazoline-2,3,'-[3H]-naphtho[2,1-b]pyran]; spiro[2H-1-benzopyran-2,2'-benzoxazoline]; 8-bromo-3'-methyl-6-nitrospiro[2H-1-benzopyran-2,2'-benzoxazoline]; 5'-chloro-3,3'-dimethyl-6-nitrospiro[2H-1-benzopyran-2,2'-benzoxazoline]; 6-chloro-3,3'-dimethyl-8-nitrospiro[2H-1-benzopyran-2,2'-benzoxazoline]; 3,3'- dimethyl-6-methoxy-8-nitrospiro[2H-1-benzopyran-2,2'-benzoxazoline]; 3,3'-dimethyl-8-methoxy-6-nitrospiro[2H-1-benzopyran-2,2'-benzoxazoline]; 3,3'-dimethyl-8-methoxy-6-nitro-5'-phenylspiro[2H-1-benzopyran-2,2'-benzoxazoline]; 3,3'-dimethyl-6-nitrospiro[2H-1-benzopyran-2,2'-benzoxazoline]; 3,3'-dimethyl-8-nitrospiro[2H-1-benzopyran-2,2'-benzoxazoline]; 3,3'-dimethyl-6-nitro-5'-phenylspiro[2H-1--benzopyran-2,2'-benzoxazoline]; 3-ethyl-3'-methyl-6-nitrospiro[2H-1-benzopyran-2,2'-benzoxazoline]; 8-methoxy-6-nitro-3,3',5',7'-tetramethylspiro[2H-1-benzopyran-2,2'-benzoxazoline]; 8-methoxy-6-nitro-3,3',5'-trimethylspiro[2H-1-benzopyran-2,2'-benzoxazoline]; 6-nitro-3,3',5'-trimethylspiro[2H-1-benzopyran-2,2'-benzoxazoline]; 8-nitro-3,3',5'-trimethylspiro[2H-1-benzopyran-2,2'-benzoxazoline]; spiro[2H-1-benzopyran-2,2'-naphth[2,3-d]oxazoline]; 3,3'-dimethyl-8-methoxy-6-nitrospiro[2H-1-benzopyran-2,2'-naphth[2,3-d]oxazoline]; 3,3'-dimethyl-6-nitrospiro[2H-1-benzopyran-2,2'-naphth[2,3-d]oxazoline]; spiro[2H-1-benzopyran-2,2'-naphth[2,1-d]oxazoline]; 3,3'-dimethyl-8-methoxy-6-nitrospiro[2H-1-benzopyran-2,2'-naphth[2,1-d]oxazoline]; 2,2'-spirobi[2H-1-benzopyran]; 3-amyl-2,2'-spirobi[2H-1-benzopyran]; 3-amyl-6'-bromo-2,2'-spirobi[2H-1-benzopyran]; 3-amyl-6-bromo-6'-methyl-2,2'-spirobi[2H-1-benzopyran]; 3-amyl-6'-bromo-6-methyl-2,2'-spirobi[2H-1-benzopyran]; 3-amyl-6,6'-dibromo-2,2'-spirobi[2H-1-benzopyran]; 3-amyl-6,6'-dimethyl-2,2'-spirobi[2H-1-benzopyran]; 3-amyl-6-methyl-2,2'-spirobi[2H-1-benzopyran]; 5-bromo-8,8'-dimethoxy-6-nitro-3'-phenyl-2,2'-spirobi[2H-1-benzopyran]; 6-bromo-6'-nitro-3-phenyl-2,2'-spirobi[2H-1-benzopyran]; 6-bromo-3'-phenyl-2,2'-spirobi[2H-1-benzopyran]; 3-benzyl-2,2'-spirobi[2H-1-benzopyran]; 3-butyl-2,2'-spirobi[2H-1-benzopyran]; 6-chloro-6'-nitro-3-phenyl-2,2'-spirobi[2H-1-benzopyran]; 8-chloro-6-nitro-3'-phenyl-2,2'-spirobi[2H-1-benzopyran]; 6,6'-dibromo-3,3'-dimethylene-2,2'-spirobi[2H-1-benzopyran]; 8,8'-dimethoxy-6'-nitro-3-phenyl-2,2'-spirobi[2H-1-benzopyran]; 3,3'-dimethyl-2,2'-spirobi[2H-1-benzopyran]; 6,6-dimethyl-3'3'-dimethylene-2,2'-spirobi[2H-1-benzopyran]; 3,3'-dimethylene-2,2'-spirobi[2H-1-benzopyran]; 6,6'-dinitro-3,3'-diphenyl-2,2'-spirobi[2H-1-benzopyran]; 3,3'-diphenyl-2,2'-spirobi[2H-1-benzopyran]; 3-ethyl-2,2'-spirobi[2H-1-benzopyran]; 8-fluoro-6-nitro-3'-phenyl-2,2'-spirobi[2H-1-benzopyran]; 8-iodo-6-nitro-3'-phenyl-2,2'-spirobi[2H-1-benzopyran]; 8'-methoxy-3-methyl-6-nitro-2,2'-spirobi[2H-1-benzopyran]; 8-methoxy-6-nitro-3'-phenyl-2,2'-spirobi[2H-1-benzopyran]; 8-methoxy-6'-nitro-3-phenyl-2,2'-spirobi[2H-1-benzopyran]; 8-methoxy-8'-nitro-3-phenyl-2,2'-spirobi[2H-1-benzopyran]; 8'-methoxy-6-nitro-3-phenyl-2,2'-spirobi[2H-1-benzopyran]; 3-methyl-2,2'-spirobi[2H-1-benzopyran]; 3-methyl-6-nitro-2,2'-spirobi[1H-1-benzopyran]; 6-nitro-3'-phenyl-2,2'-spirobi[2H-1-benzopyran]; 3-phenyl-2,2'-spirobi[2H-1-benzopyran]; 3,3'-tetramethylene-2,2'-spirobi[2H-1-benzopyran]; 3,3'-trimethylene-2,2'-spirobi[2H-1-benzopyran]; 3,3'-spirobi[3H-naphtho[2,1-b]pyran]; 2-amyl-3,3'-spirobi[3H-naphtho[2,1-b]pyran]; 2-benzyl-3,3'-spirobi[3H-naphtho[2,1-b]pyran]; 2-butyl-3,3'-spirobi[3H-naphtho[2,1-b]pyran]; 2-chloro-3,3'-spirobi[3H-naphtho[2,1-b]pyran]; 2-chloro-8,8'-dinitro-3,3'-spirobi[3H-naphtho[2,1-b]pyran]; 2-decyl-3,3'-spirobi[3H-naphtho[2,1b]pyran]; 8,8'-dibromo-3,3'-spirobi[3H-naphtho[2,1-b]pyran]; 2,2'-dicarboethoxy-3,3'-spirobi[3H-naphtho[2,1-b]pyran]; 2,2'-dicarbomethoxy-3,3'-spirobi[3H-naphtho[2,1-b]pyran]; 2,2'-diethyl-3,3'-spirobi[3H-naphtho[[2,1-b]pyran]; 5,5'-dimethoxy-3,3'-spirobi[3H-naphtho[2,1b]pyran]; 5,5'-dimethoxy-8,8'-dinitro-3,3'-spirobi[3H-naphtho[2,1-b]pyran]; 5,5'-dimethoxy-10,10'-dinitro-3,3'-spirobi[3H-naphtho[2,1-b]pyran]; 9,9'-dimethoxy-8,8'-dinitro-3,3'-spirobi[3H-naphtho[2,1-b]pyran]; 2,2'-dimethyl-3,3'-spirobi[3H-naphtho[2,1-b]pyran]; 2,2'-dimethyl-8,8'-dinitro-3,3'-spirobi[3H-naphtho[2,1-b]pyran]; 5,5'-dimethyl-10,10'-dinitro-3,3'-spirobi[3H-naphtho[2,1-b]pyran]; 9,9'-dimethyl-8,8'-dinitro-3,3'-spirobi[3H -naphtho[2,1-b]pyran]; 9,9-dimethyl-7,7'-dinitro-3,3'-spirobi[3H-naphtho[2,1-b]pyran]; 2-(γ,γ-dimethylallyl)-3,3'-spirobi[3H-naphtho[2,1b]pyran]; 2,2'-dimethylene-3,3'-spirobi[3H-naphtho[2,1-b]pyran]; 7,7'-dinitro-3,3'-spirobi[3H-naphtho[2,1-b]pyran]; 8,8'-dinitro-3,3'-spirobi[3H-naphtho[2,1-b]pyran]; 9,9'-dinitro-3,3'-spirobi[3H-naphtho[2,1-b]pyran]; 10,10'-dinitro-3,3'-spirobi[3H-naphtho[2,1-b]pyran]; 8,8'-dinitro-2-methyl-3,3'-spirobi[3H-naphtho[2,1-b]pyran]; 8,8'-dinitro-2,2'-(2"methyl)trimethylene-3,3'-spirobi[3H-naphtho[2,1-b]pyran]; 8,8'-dinitro-2-phenyl-3,3'-spirobi[3H-naphtho[2,1-b]pyran]; 8,8'-dinitro-2,2'-trimethylene-3,3'-spirobi[3H-naphtho[2,1-b]pyran]; 2,2'-diphenyl-3,3'-spirobi[3H-naphtho[2,1-b]pyran]; 2-ethyl-3,3'-spirobi[3H-naphtho[2,1b]pyran]; 2-heptyl-3,3'-spirobi[3H-naphtho[2,1-b]pyran]; 2-hexyl-3,3'-spirobi[3H-naphtho[2,1-b]pyran]; 2-isobutyl-3,3'-spirobi[3H-naphtho[2,1b]pyran]; 2-isopropyl-3,3'-spirobi[3H-naphtho[2,1b]pyran]; 2-methyl-3,3'-spirobi[3H-naphtho[2,1-b]pyran]; 2,2'-(2"-methyl)trimethylene-3,3'-spirobi[3H-naphtho[2,1-b]pyran]; 8'-nitro-2-phenyl-3,3'-spirobi[3H-naphtho[2,1-b]pyran]; 2-octyl-3,3'-spirobi[3H-naphtho[2,1-b]pyran]; 2-phenyl-3,3'-spirobi[3H-naphtho[2,1-b]pyran]; 2-(β-phenylethyl)-3,3'-spirobi[3H-naphtho[2,1-b]pyran]; 2-propyl-3,3'-spirobi[3H-naphtho[2,1b]pyran]; 2,2'-tetramethylene-3,3'-spirobi[3H-naphtho[2,1-b]pyran]; 2,2'-trimethylene-3,3'-spirobi[3H-naphtho[2,1-b]pyran]; 2,2'-spirobi[2H-naphtho[1,2-b]pyran]; 3-amyl-2,2'-spirobi[2H-naphtho[1,2-b]pyran]; 6,6'-dichloro-2,2'-spirobi[2H-naphtho[1,2-b]pyran]; 7,7'-dinitro-2,2'-spirobi[2H-naphtho[1,2-b]pyran]; 8,8'-dinitro-2,2'-spirobi[2H-naphtho[1,2-b]pyran]; 9,9'-dinitro-2,2'-spirobi[2H-naphtho[1,2-b]pyran]; 10,10'-dinitro-2,2'-spirobi[2H-naphtho[1,2-b]pyran]; 3-phenyl-2,2'-spirobi[2H-naphtho[1,2b]pyran]; 2,2'-spirobi[2H-1-benzopyran-2,3'-[3H]-naphtho[2,1-b]pyran]; 2'-amylspiro[2H-1-benzopyran-2,3'-[3H]-naphtho[2,1-b]pyran]; 3-amylspiro[2H-1-benzopyran-2,3'-[3H]-naphtho[2,1-b]pyran]; 3-amyl-6-bromospiro[2H-1-benzopyran-2,3'-[3H]-naphtho[2,1-b]pyran]; 3-amyl-7-chlorospiro[2H-1-benzopyran-2,3'-[3H]-naphtho[2,1-b]pyran]; 3-amyl-6-hydroxyspiro[2H-1-benzopyran-2,3'-[3H]-naphtho[2,1-b]pyran]; 3-amyl-6-methoxyspiro[2H-1-benzopyran-2,3'-[3H]-naphtho[2,1-b]pyran]; 3-amyl-7-methoxyspiro[2H-1-benzopyran-2,3'-[3H]-naphtho[2,1-b]pyran]; 3-amyl-6-methylspiro[2H-1-benzopyran-2,3'-[3H]-naphtho[2,1-b]pyran]; 3-amyl-7-methylspiro[2H-1-benzopyran-2,3'-[3H]-naphtho[2,1-b]pyran]; 3-amyl-6-nitrospiro[2H-1-benzopyran-2,3'-[3H]-naphtho[2,1-b]pyran]; 2'-benzylspiro[2H-1-benzopyran-2,3'-[3H]-naphtho[[2,1-b]pyran]; 3-benzylspiro[2H-1-benzopyran-2,3'-[3H]-naphtho[2,1-b]pyran]; 6-bromospiro[2H-1-benzopyran-2,3'-[3H]-naphtho[2,1-b]pyran]; 6-bromo-8-methoxy-3-methyl-8'-nitrospiro[2H-1-benzopyran-2,3'-[3H[-naphtho[2,1-b]pyran]; 8'-bromo-8-methoxy-3-phenylspiro[2H-1-benzopyran-2,3'-[3H]-naphtho[2,1-b]pyran]; 6-bromo-3-methyl-8'-nitrospiro[2H-1-benzopyran-2,3'-[3H]-naphtho[2,1-b]pyran]; 6-bromo-8'-nitro-3-phenylspiro[2H-1-benzopyran-2,3'-[3H]-naphtho[2,1b]pyran]; 8'-bromo-3-phenylspiro[2H-1-benzopyran-2,3'-[3H]-naphtho[2,1b]pyran]; 6-chloro-8-methoxy-3-methyl-8'-nitrospiro[2H-1-benzopyran-2,3'-[3H]-naphtho[2,1-b]

pyran]; 6-chloro-3-methylspiro[2H-1-benzopyran-2,3'-[3H]-naphtho[2,1-b]pyran]; 6-chloro-3-methyl-8'-nitrospiro[2H-1-benzopyran-2,3'-[3H]-naphtho[2,1-b]pyran]; 8-chloro-3-methyl-8'-nitrospiro[2H-1-benzopyran-2,3'-[3H]-naphtho[2,1-b]pyran]; 6-chloro-8'-nitro-3-phenylspiro[2H-1-benzopyran-2,3'-[3H]-naphtho[2,1-b]pyran]; 7-diethylamino-3-methyl-8'-nitrospiro[2H-1-benzopyran-2,3'-[3H]-naphtho[2,1-b]pyran]; 5,7-dimethoxy-8'-nitro-3-phenylspiro[2H-1-benzopyran-2,3'-[3H]-naphtho[2,1-b]pyran]; 2',3-dimethylspiro[2H-1-benzopyran-2,3'-3H]-naphtho[2,1-b]pyran]; 2',3'-dimethylenespiro[2H-1-benzopyran-2,3'-[3H]-naphtho[2,1-b]pyran]; 6-fluoro-3-methyl-8'-nitrospiro[2H-1-benzopyran-2,3'-[3H]-naphtho[2,1-b]pyran]; 2-isopropylspiro[2H-1-benzopyran-2,3'-[3H]-naphtho[2,1-b]pyran]; 3-isopropylspiro[2H-1-benzopyran-2,3'-[3H]-naphtho[2,1-b]pyran]; 8-methoxy-2'-methylspiro[2H-1-benzopyran-2,3'-[3H]-naphtho[2,1-b]pyran]; 8-methoxy-2'-methyl-8'-nitrospiro[2H-1-benzopyran-2,3'-3H]-naphtho[2,1-b]pyran]; 8-methoxy-3-methyl-6-nitrospiro[2H-1-benzopyrano-2,3'-[3H]-naphtho[2,1-b]pyran]; 8-methoxy-3-methyl-8'-nitrospiro[2H-1-benzopyran-2,3'-3-H]-naphtho[2,1-b]pyran]; 7-methoxy-2'-methyl-4-phenylspiro[2H-1-benzopyran-2,3'-[3H]-naphtho[2,1-b]pyran]; 7-methoxy-3-methyl-4-phenylspiro[2H-1-benzopyran-2,3'-[3H]-naphtho[2,1-b]pyran]; 8-methoxy-8'-nitro-3-phenylspiro[2H-1-benzopyran-2,3'-[3H]-naphtho[2,1-b]pyran]; 2'-methylspiro[2H-1-benzopyran-2,3'-[3H]-naphtho[2,1-b]pyran]; 3-methylspiro[2H-1-benzopyran-2,3'-[3H]-naphtho[2,1-b]pyran]; 6-methylspiro[2H-1-benzopyran-2,3'-[3H]-naphtho[2,1-b]pyran]; 3-methyl-6-nitrospiro[2H-1-benzopyran-2,3'-[3H]-naphtho[2,1-b]pyran]; 2'-methyl-4-phenylspiro[2H-1-benzopyran-2,3'-[3H]-naphtho[2,1-b]pyran]; 8'-nitro-3-(o-nitrophenyl)spiro[2H-1-benzopyran-2,3'-[3H]-naphtho[2,1-b]pyran]; 8'-nitro-3-phenylspiro[2H-1-benzopyran-2,3'-[3H]-naphtho[2,1-b]pyran]; 2'-octylspiro[2H-1-benzopyran-2,3'-[3H]-naphtho[2,1-b]pyran]; 2'-phenylspiro[2H-1-benzopyran-2,3'-[3H]-naphtho[2,1-b]pyran]; 3-phenylspiro[2H-1-benzopyran-2,3'-[3H]-naphtho[2,1-b]pyran]; 2'-(β-phenylethyl)spiro[2H-1-benzopyran-2,3'-[3H]-naphtho[2,1-b]pyran]; 3-(β-phenylethyl)spiro[2H-1-benzopyran-2,3'-[3H]-naphtho[2,1-b]pyran]; 2',3-trimethylenespiro[2H-1-benzopyran-2,3'-[3H]-naphtho[2,1-b]pyran]; spiro[2H-1-benzopyran-2,2'-2H]-naphtho[1,2-b]pyran]; 3-amylspiro[2H-1-benzopyran-2,2'-[2H]-naphtho[1,2-b]pyran]; 3'-amylspiro[2H-1-benzopyran-2,2'-[2H]-naphtho[1,2-b]pyran]; 3-amyl-6-bromospiro[2H-1-benzopyran-2,2'-[2H]-naphtho[1,2-b]pyran]; 3-amyl-6-mehoxyspiro[2H-1-benzopyran-2,2'-[2H]-naphtho[1,2-b]pyran]; 3-amyl-6-methylspiro[2H-1-benzopyran-2,2'-[2H]-naphtho[1,2-b]pyran]; 3-amyl-6-nitrospiro[2H-1-benzopyran-2,2'-[2H]-naphtho[1,2-b]pyran]; 6'-chloro-8-methoxy-3-phenylspiro[2H-1-benzopyran-2,2'-[2H]-naphtho[1,2-b]; 3'methyl-4'-phenylspiro[2H-1-benzopyran-2,2'-[2H]-naphtho[1,2-b]pyran]; 3-phenylspiro[2H-1-benzopyran-2,2'-[2H]-naphtho[1,2-b]pyran]; phenylspiro[2H-1-benzopyran-2,2'-[2H]-naphtho[1,2-b]pyran]; spiro[3H-anthraceno[2,1-b]pyran-3,2'-[2H]-1-benzopyran]; spiro[2H-1-benzopyran-2,2'-[2H]-phenanthreno[2,1-b]pyran]; spiro[3H-anthraceno[2,1-b]pyran-3,3'-[3H]-naphtho[2,1-b]pyran]; spiro[3H-naphtho[2,1-b]pyran-3,2'-[2'-H]phenanthreno[2,1-b]pyran]; 2,2'-spirobi[2H-phenanthreno[2,1-b]pyran]; spiro[4H-1-benzopyran-4,3'-[3H]-naphtho[2,1-b]pyran]; 2,3-diphenyl-7-methoxyspiro[4H-1-benzopyran-4,3'-[3H]-naphtho[2,1-b]pyran]; 2,3-diphenyl-7-methoxy-8'-nitrospiro[4H-1-benzopyran-4,3'-[3H]-naphtho[2,1-b]pyran]; 2,3-diphenyl-8'-nitrospiro[4H-1-benzopyran-4,3'-[3H]-naphtho[2,1-b]

pyran]; 7-methoxy-3-methyl-8'-nitro-2-phenylspiro[4H-1-benzopyran-4,3'-[3H]-naphtho[2,1-b]pyran]; 6-methoxy-3-methyl-2-phenylspiro[4H-1-benzopyran-4,3'-[3H]-naphtho[2,1-b]pyran]; 7-methoxy-3-methyl-2-phenylspiro[4H-1-[2,1-b]pyran]; 7-methoxy-3-methyl-2-phenylspiro[4H-1-benzopyran-4,3'-[3H]-naphtho[2,1-b]pyran]; 3-(p-methoxyphenyl)-8'-nitro-2-phenylspiro[4H-1-benzopyran-4,3'-[3]-naphtho[2,1-b]pyran]; 3-methyl-2-phenylspiro[4H-1-benzopyran-4,3'-[3H]-naphtho[2,1-b]pyran]; spiro[2H-naphtho[1,2-b]pyran-2,3'-[3H]-naphtho[2,1-b]pyran]; 2'-amylspiro[2H-naphtho[1,2-b]pyran-2,3'-[3H]-naphtho[2,1-b]pyran]; 3-amylspiro[2H-naphtho[1,2-b]pyran-2,3'-[3H]-naphtho[2,1-b]pyran]; 2',3-dimethyl-4-phenylspiro[2H-naphtho[1,2-b]pyran-2,3'-[3H]-naphtho[2,1-b]pyran]; 2'-3-dimethylenespiro[2H-naphtho[1,2-b]pyran-2,3'-[3H]-naphtho[2,1-b]pyran]; 2'-methyl-4-phenylspiro[2H-naphtho[1,2-b]pyran-2,3'-[3H]-naphtho[2,1-b]pyran]; 3-methyl-4-phenylspiro[2H-naphtho[1,2-b]pyran-2,3'-[3H]-naphtho[2,1-b]pyran]; 2'-phenylspiro[2H-naphtho[1,2-b]pyran-2,3'-[3H]-naphtho[2,1-b]pyran]; 3-phenylspiro[2H-naphtho[1,2-b]pyran-2,3'-[3H]-naphtho[2,1-b]pyran]; 4-phenylspiro[2H-naphtho[1,2-b]pyran-2,3'-[3H]-naphtho[2,1-b]pyran]; 2',3-trimethylenespiro[2H-naphtho[1,2-b]pyran-2,3'-[3H]-naphtho[2,1-b]pyran]; spiro[4H-napththo[1,2-b]pyran-4,3'-[3H]-naphtho[2,1-b]pyran]; 3-methyl-8'-nitro-2-phenylspiro[4H-napththo[1,2-b]pyran-4,3'-[3H]-naphtho[2,1-b]pyran]; spiro[2H-1-benzopyran-2,9'-xanthene]; 6,8-dinitrospiro[2H-1-benzopyran-2,9'-xanthene]; 3'-hydroxy-6-nitrospiro[2H-1-benzopyran-2,9'-xanthene]; 6-nitrospiro[2H-1-benzopyran-2,9'-xanthene]; 8-nitrospiro[2H-1-benzopyran-2,9'-xanthene]; spiro[3H-naphtho[2,1-b]pyran-3,9'-xanthene]; 2-methylspiro[3H-naphtho[2,1-b]pyran-3,9'-xanthene]; 8-nitrospiro[3H-naphtho[2,1-b]pyran-3,9'-xanthene]; spiro[3H-naphtho[2,1-b]pyran-3,2'-[2H]pyran; 4',6'-diphenylspiro[3H-naphtho[2,1-b]pyran-3,2'-[2H]pyran; spiro[indoline-2,2'-pyrano[3,2-H]quinoline]; 6'-bromo-1,3,3-trimethylspiro[indoline-2,2'-pyrano[3,2-H]quinoline]; 5-chloro-1,3,3,6'-tetramethylspiro[indoline-2,2'-pyrano[3,2-H]quinoline]; 5-chloro-1,3,3,9'-tetramethylspiro[indoline-2,2'-pyrano[3,2-H]quinoline]; 5-chloro-1,3,3-trimethylspiro[indoline-2,2'-pyrano[3,2-H]quinoline]; 3,3-dimethyl-1-ethylspiro[indoline-2,2'-pyrano[3,2-H]quinoline]; 3,3-dimethyl-1-propylspiro[indoline-2,2'-pyrano[3,2-H]quinoline]; 1-ethyl-3,3,6'-trimethylspiro[indoline-2,2'-pyrano[3,2-H]quinoline]; 5-fluoro-1,3,3,6'-tetramethylspiro[indoline-2,2'-pyrano[3,2-H]quinoline]; 5-fluoro-1,3,3-trimethylspiro[indoline-2,2'-pyrano[3,2-H]quinoline]; 1,3,3,6',7-pentamethylspiro[indoline-2,2'-pyrano[3,2-H]quinoline]; 1,3,3,7,9'-pentamethylspiro[indoline-2,2'-pyrano[3,2-H]quinoline]; 1-propyl-3,3,6'-trimethylspiro[indoline-2,2'-pyrano[3,2-H]quinoline]; 1,3,3,7-tetramethylspiro[indoline-2,2'-pyrano[3,2-H]quinoline]; 1,3,3,9-tetramethylspiro[indoline-2,2'-pyrano[3,2-H]quinoline]; spiro[indoline-2,3'[-3H]-naphtho[2,1-b]-1,4-oxazine]; 5-chloro-1,3,3-trimethylspiro[indoline-2,3'-[3H]-naphtho[2,1-b]-1,4-oxazine]; 1,3,3-trimethylspiro[indoline-2,3'[-3H]-naphtho[2,1-b]-1,4-oxazine]; spiro[indoline-2,2'-[2H]-pyrano[3,4-b]pyridine]; 5'-hydroxymethyl-1,3,3,8'-tetramethylspiro[indoline-2,2'-[2H]pyrano[3,4-b]pyridine]; spiro[indoline-2,2'-[2H]-pyrano[3,2-b]pyridine]; 5-chloro-1,3,3-trimethylspiro[indoline-2,2'-[2H]-pyrano[3,2-b]pyridine]; spiro[indoline-2,2'-[2H]-pyrano[3,2-c]quinoline]; 1,3,3,5'-tetramethylspiro[indoline-2,2'-[2H]-pyrano[3,2-c]quinoline]; spiro[2H-1,4-benzoxazine-2,2'-indoline]; 1',3',3'-trimethylspiro[2H-1,4-benzoxazine-2,2'-indoline]; spiro[2H-1-benzopyran-2,2'-[2H]quinoline]; 6-bromo-3-isopropyl-1'-methylspiro[2H-1-benzopyran-2,2'-[2H]quinoline]; 6-bromo-1'-methylspiro[2H-1-benzopyran-2,2'-

[2H]quinoline]; 3,3'-dimethylene-1'-methylspiro[2H-1-benzopyran-2,2'-[2H]quinoline]; 1'-ethylspiro[2H-1-benzopyran-2,2'-[2H]quinoline]; 1'-ethyl-6-nitrospiro[2H-1-benzopyran-2,2'-2H]quinoline]; 1'-ethyl-8-nitrospiro[2H-1-benzopyran-2,2'-[2H]quinoline]; 6-methoxy-1'-methylspiro[2H-1-benzopyran-2,2'-[2H]quinoline]; 7-methoxy-1'-methylspiro[2H-1-benzopyran-2,2'-[2H]quinoline]; 1'-methylspiro[2H-1-benzopyran-2,2'-[2H]quinoline]; 1'-methyl-6-nitrospiro[2H-1-benzopyran-2,2'-[2H]quinoline]; 1'-methyl-3,3'-trimethylenespiro[2H-1-benzopyran-2,2'-[2H]quinoline]; 6-nitro-1',3,3'-trimethylspiro[2H-1-benzopyran-2,2'-[2H]quinoline]; spiro[3H-naphtho[2,1-b]pyran-3,2'-[2H]quinoline]; 2-isopropyl-1'-methylspiro[3H-naphtho[2,1-b]pyran-3,2'-[2H]quinoline]; 1'-methylspiro[3H-naphtho[2,1-b]pyran-3,2'-[2H]quinoline]; spiro[2H-1-benzopyran-2,2'-[2H]pyridine]; 6-bromo-1'-methylspiro[2H-1-benzopyran-2,2'-[2H]pyridine]; 1',3-dimethyl-6-nitrospiro[2H-1-benzopyran-2,2'-[2H]pyridine]; 6,8-dinitro-1'-methyl-3-phenylspiro[2H-1-benzopyran-2,2'-[2H]pyridine]; 1'-ethylspiro[2H-1-benzopyran-2,2'-[2H]pyridine]; 3-ethyl-1'-methyl-6-nitrospiro[2H-1-benzopyran-2,2'-[2H]pyridine]; 1'-ethyl-6-nitrospiro[2H-1-benzopyran-2,2'-[2H]pyridine]; 1'-ethyl-8-nitrospiro[2H-1-benzopyran-2,2'-[2H]pyridine]; 7-methoxy-1'-methylspiro[2H-1-benzopyran-2,2'-[2H]pyridine]; 1'-methylspiro[2H-1-benzopyran-2,2'-[2H]pyridine]; 1'-methyl-6-nitrospiro[2H-1-benzopyran-2,2'-[2H]pyridine]; spiro[3H-naphtho[2,1-b]pyran-3,2'-[2H]pyridine]; 1'-methylspiro[3H-naphtho[2,1-b]pyran-3,2'-[2H]pyridine]; 1',4',6'-triphenylspiro[3H-naphtho[2,1-b]pyran-3,2'-[2H]pyridine]; spiro[9H-acridine-9,2'-[2H]benzopyran]; 8'-methoxy-10-methylspiro[9H-acridine-9,2'-[2H]benzopyran]; 10-methylspiro[9H-acridine-9,2'-[2H]benzopyran]; spiro[9H-acridine-9,3'-3H]-naphtho[2,1b]pyran]; 10-methylspiro[9H-acridine-9,3'-[3H]-naphtho[2,1-b]pyran]; spiro[indoline-2,2'-[2H]pyrano[2,3-b]indole]; 5-chloro-1,3,3,9'-tetramethylspiro[indoline-2,2'-[2H]pyrano[2,3-b]indole]; spiro[indoline-2,2'-[2H]pyrano[3,2-b]indole]; 5-chloro-1,3,3-trimethylspiro[indoline-2,2'-[2H]pyrano[3,2-b]indole]; spiro[indoline-2,2'-[2H]pyrano[2,3-b]benzofuran]; 1,3,3-trimethyl spiro[indoline-2,2'-[2H]pyrano[2,3-b]benzofuran]; spiro[indoline-2,2'-[2H]pyrano[3,2-b]benzofuran]; 5-chloro-1,3,3-trimethylspiro[indoline-2,2'-[2H]pyrano[3,2-b]benzofuran]; spiro[2H-1-benzothieno[2,3-b]pyran-2,2'-indoline]; 5'-chloro-1',3',3'-trimethylspiro[2H-1-benzothieno[2,3-b]pyran-2,2'-indoline]; spiro[2H]-1-benzothieno[3,2-b]pyran-2,2'-indoline]; 5'-chloro-1',3',3'-trimethylspiro[2H]-1-benzothieno[3,2-b]pyran-2,2'-indoline]; spiro[3H-naphtho[2,1-b]pyran-3,9'-thioxanthene]; 4'-chloro-8-nitrospiro[3H-naphtho[2,1-b]pyran-3,9'-thioxanthene]; spiro[2H,8H-benzo[1,2-b:-3,4-b']dipyran-8-2'-indoline]; -2-one; 1',3',3',4-tetramethylspiro[2H,8H-benzo[1,2-b:-3,4-b']dipyran-8-2'-indoline]-2-one; spiro[2H-1-benzopyran-2,2'-oxazoline]; 3'-methyl-6-nitro-5'-phenylspiro[2H-1-benzopyran-2,2'-oxazoline]; spiro[2H-1-benzothiopyran-2,2'-indoline]; 1,3',3'-trimethylspiro[2H-1-benzothiopyran-2,2'-indoline]; spiro[3H-naphtho[2,1-b]pyran-3,2'-thiazoline]; 4',5'-dihydro-2,3'-dimethylspiro[3H-naphtho[2,1-b]pyran-3,2'-thiazoline]; m-dithiol[5,4b:5,6-b']bis[1]benzopyranspiro[3H-naphtho[2,1-b]pyran-3,2'-thiazoline]; 6H,8H-thiopyrano[4,3-b:4,5-b']bis[1]benzopyranspiro[3H-naphtho[2,1-b]pyran-3,2'-thiazoline]; 6H,8H-bisnaphtho[1',2': 5,6]pyrano[3,2-c:2',3'-d]thiopyranspiro[3H-naphtho[2,1-b]pyran-3,2'-thiazoline]; spiro[2H-1-benzopyran-2,1'-isoindoline]; 6-nitro-2',3',3'-trimethylspiro[2H-1-benzopyran-2,1'-isoindoline]; spiro[indoline-2,3'-[3H]pyrano-[3,2-a]xanthene]-12'-one; 5-chloro-3',12'-dihydro-1,3,3-trimethylspiro[indoline-2,3'-[3H]pyrano-[3,2-a]xanthene]-12'-one; spiro[benzoselenazole-2,3'-[3H]naphtho[2,1-b]pyran]; 3-ethylspiro[benzoselenazole-2,3'-[3H]-naphtho[2,1-b]pyran]; and the like. Mixtures of two or more spiro compounds can also be used.

One spiro compound preferred for lightfastness and reversibility of the photochromic shift over a number of times is of the formula

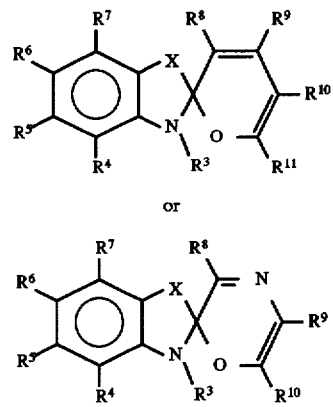

wherein X is a sulfur atom, a selenium atom, an oxygen atom, a —$CH_2$— group, a —$CHR^1$— group, or a —$CR^1R^2$— group, and wherein $R^1$, $R^2$, $R^3$, $R^4$, $R^5$, $R^6$, $R^7$, $R^8$, $R^9$, $R^{10}$, and $R^{11}$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH$—), allyl ($H_2C=CH—CH_2$—), propynyl ($HC≡C—CH_2$—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Spiropyrans, spirooxazines, and spirothiopyrans are known compounds and can be prepared as described in, for example, U.S. Pat. No. 3,293,055; U.S. Pat. No. 3,451,338; U.S. Pat. No. 3,100,778; U.S. Pat. No. 3,290,331; U.S. Pat. No. 3,231,584; U.S. Pat. No. 3,299,079; U.S. Pat. No. 3,291,604; U.S. Pat. No. 3,149,120; U.S. Pat. No. 3,022,318; U.S. Pat. No. 2,978,462; U.S. Pat. No. 3,413,234; U.S. Pat. No. 3,407,145; French Patent 1,450,583; French Patent 1,451,332; Zelichenok et al., *Macromolecules*, vol. 25, p. 3179 et seq. (1992); A. I. Kiprianov et al., *Zh. Obshch. Khim.*, vol. 17, p. 1468 (1947); E. B. Knott, *J. Chem. Soc.*, vol. 1951, p. 3038 (1951); Y. Hirshberg et al., *J. Chem. Soc.* vol. 1955, p. 3313 (1955); C. Schiele et al., *Tetrahedron*, vol. 23, p. 3733 (1967); T. A. Shakhverdov et al., *Opt. Spektrosk.*, vol. 24, p. 619 (1968); R. Guglielmetti et al., *J. Chim. Phys.*, vol. 65, p. 454 (1968); A. Hinnen et al., *Bull. Soc. Chim. Fr.*, p. 2066 (1968); E. Berman et al., *J. Amer. Chem. Soc.*, vol. 81, p. 5605 (1959); D. P. Maisuradze et al., *Soobshch. Akad. Nauk Gruz. SSR*, vol. 50, p. 77 (1968); D. P. Maisuradze et al., *Soobshch. Akad. Nauk Gruz. SSR*, vol. 49, p. 75 (1968); T. Bercovici et al., *Mol. Photochem.*, vol. 1, p. 23 (1969); O. F. Koelsch et al., *J. Amer. Chem. Soc.*, vol. 74, p. 6288 (1952); O. Chaude, *Cahiers Phys. (France)*, vol. 52, p. 39 (1954); I. Shimidzu et al., *Kogyo Kagaku Zasshi*, vol. 72, p. 171 (1969); I. Shimidzu et al., *Bull. Chem. Soc. Jap.*, vol. 42, p. 1730 (1969); I. Shimidzu et al., *Nippon Kagaku Zasshi*, vol. 88, p. 1127 (1967); I. Shimidzu, et al., *Nippon Kagaku Zasshi*, vol. 89, p. 755 (1968); C. Balny et al., *Tetrahedron Lett.*, vol. 1968, p. 5097 (1968); J. Arnaud et al., *J. Chim. Phys.*, vol. 64, p. 1165 (1967); R. Wizinger et al., *Helv. Chim. Acta*, vol. 23, p. 247 (1940); L. D. Taylor et al., *Tetrahedron Lett.*, vol. 1967, p. 1585 (1967); A. I. Nogaideli et al., *Soobshch. Akad. Nauk Gruz. SSR*, vol. 40, p. 607 (1965); E. D. Bergmann et al., *J. Amer. Chem. Soc.*, vol. 7, p. 5009 (1950); C. Schiele et al., *Angew. Chem.*, vol. 78, p. 389 (1966); C. Schiele et al., *Ann. Chem.*, vol. 696, p. 81(1966); C. Schiele et al., *Tetrahedron Lett.*, vol. 1966, p. 4409 (1966); R. Guglielmetti et al., *Bull. Soc. Chim. Fr.*, vol. 1967, p. 2824 (1967); Z. M. Elashvili et al., *Soobshch. Aka Nauk Gruz. SSR*, vol. 52, p. 351(1968); O. Dumenil et al., *Bull. Soc. Chim. Fr.*, vol. 1969, p. 817 (1969); P. H. Vandewijer et al., *J. Polym. Sci. Part C*, vol. 22, p. 231 (1968); A. V. Shablya et al., *Opt. Spektrosk.*, vol. 20, p. 738 (1966); H. Decker et al., *Chem. Ber.*, vol. 41, p. 2997 (1908); O. Arnold, *Z. Naturforsch.*, vol. 21b, p. 291(1966); C. Schiele et al., *Ann. Chem.*, vol. 722, p. 162 (1969); I. M. Heilbron et al., *J. Chem. Soc.*, vol. 1931, p. 1336 (1931); A. Lowenbein et al., *Chem. Ber.*, vol. 59, p. 1377 (1926); W. Borsche et al., *Ann. Chem.*, vol. 393, p. 29 (1912); R. Dickinson et al., *J. Chem. Soc.*, vol. 1928, p. 2077 (1928); W. Dilthey et al., *J. Prakt. Chem.*, vol. 1, p. 179 (1926); R. Dickinson et al., *J. Chem. Soc.*, vol. 1927, p. 14 (1927); R. Dickinson et al., *J. Chem. Soc.*, vol. 1927, p. 1699 (1927); W. Dilthey et al., *Chem. Ber.*, vol. 61, p. 963 (1928); I. M. Heilbron et al., *J. Chem. Soc.*, vol. 1933, p. 430 (1933); I. M. Heilbron et al., *J. Chem. Soc.*, vol. 1929, p. 936 (1929); I. M. Heilbron et al., *J. Chem. Soc.*, vol. 1936, p. 1380 (1936); C. Schiele et al., *Tetrahedron Lett.*, vol. 1966, p. 4413 (1966); I. M. Heilbron et al., *J. Chem. Soc.*, vol. 1934, p. 1571 (1934); I. M. Heilbron et al., *J. Chem. Soc.*, vol. 1933, p. 1263 (1933); F. Irving, *J. Chem. Soc.*, vol. 1929, p. 1093 (1929); F. Przystal et al., *Anal. Chim. Acta*, vol. 41, p. 391 (1968); C. F. Koelsch, *J. Org. Chem.*, vol. 16, p. 1362 (1951); R. S. Becker et al., *J. Phys. Chem.*, vol. 72, p. 997 (1968); E. O. Howard et al., *J. Amer. Chem. Soc.*, vol. 82, p. 158 (1960); A. I. Nogaideli et al., *Soobshch. Akad. Nauk Gruz. SSR*, vol. 49, p. 573 (1968); A. Samat et al., *Bull. Soc., Chim. Belg.*, vol. 100, no. 9, p. 679 (1991); G. Petilion, Ph.D. Thesis, University of Brest (1979); M. Maguet, Ph.D. Thesis, University of Brest (1980); and R. Guglielmetti et al., *Bull. Soc. Chim. France*, vol 1971, p. 2039 (1971); the disclosures of each of which are totally incorporated herein by reference. Spiro compounds are also available commercially from, for example, Aldrich Chemical Company, Milwaukee, Wis., Nippon Kankoh-Shikiso Kenkyusho Co. Ltd., Okayama, Japan, Chroma Chemicals Inc., Dayton, Ohio, and the like. Specific examples of suitable commercially available spiropyrans and spirooxazines include 27,361-9; 32,254-7; 32,255-5; 32,256-3; and 32,257-1, available from Aldrich; SP-1822; SP-98; SP-48; SP-12;, and SP-99, available from Nippon Kankoh -Shikiso Kenkyusho; and the like.

Stilbene compounds are of the general formula

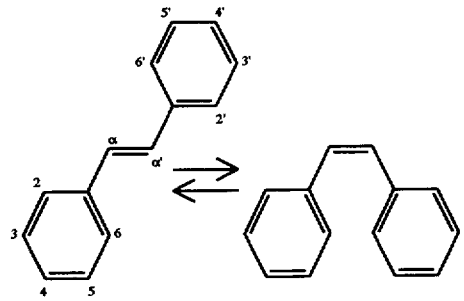

wherein substituents may be present at the 2, 3, 4, 5, 6, 2',3', 4', 5', and 6' positions. Examples of suitable substituents include (but are not limited to) alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC\equiv C—CH_2—$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Specific examples of stilbenes include stilbene (no substituents), 3-methylstilbene, 4-methoxystilbene, 3-methoxystilbene, 4-aminostilbene, 4-fluorostilbene, 3-fluorostilbene, 4-chlorostilbene, 3-chlorostilbene, 4-bromostilbene, 3-bromostilbene, 3-iodostilbene, 4-cyanostilbene, 3-cyanostilbene, 4-acetylstilbene, 4-benzoylstilbene, 4-phenacylstilbene, 4-nitrostilbene, 3-nitrostilbene, 3-nitro-3'-methoxystilbene, 3-nitro-4-dimethylaminostilbene, 4,4'-dinitrostilbene, 4-nitro-4'-methoxystilbene, 4-nitro-3'-methoxystilbene, 4-nitro-4'-aminostilbene, 4-nitro-4'-dimethylaminostilbene, α-methylstilbene, α,α'-dimethylstilbene, α,α'-difluorostilbene, α,α'-dichlorostilbene, 2,4,6-trimethylstilbene, 2,2',4,4',6,6'-hexamethylstilbene, and the like. Stilbene compounds are well known and can be prepared as described in, for example, G. S. Hammond et al., *J. Amer. Chem. Soc.*, vol. 86, p. 3197 (1964), W. G. Herkstroeter et al., *J. Amer. Chem. Soc.*, vol. 88, p. 4769 (1966), D. L. Beveridge et al., *J. Amer. Chem. Soc.*, vol. 87, p. 5340 (1965), D. Gegiou et al., *J. Amer. Chem. Soc.*, vol. 90, p. 3907 (1968), D. Schulte-Frohlinde et al., *J. Phys. Chem.*, vol. 66, p. 2486 (1962), S. Malkin et al., *J. Phys. Chem.*, vol. 68, p. 1153 (1964), S. Malkin et al., *J. Phys. Chem.*, vol. 66, p. 2482 (1964), H. Stegemeyer, *J. Phys. Chem.*, vol. 66, p. 2555 (1962), H. Gusten et al., *Tetrahedron Lett.*, vol. 1968, p. 3097 (1968), D. Gegiou et al., *J. Amer. Chem. Soc.*, vol. 90, p. 12 (1968), K. Kruger et al., *J. Phys. Chem.*, vol. 66, p. 293 (1969), and D. Schulte-Frohlinde, *Ann.*, vol. 612, p. 138 (1958), the disclosures of each of which are totally incorporated herein by reference.

Aromatic azo compounds which exhibit photochromism are of the general formula

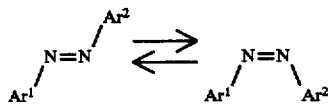

wherein $Ar^1$ and $Ar^2$ are each, independently of the other, selected from the group consisting of aromatic groups. The aromatic groups can be substituted, with examples of substituents including (but not limited to) alkyl, including cyclic alkyl groups, such as cyclopropyl, cyclohexyl, and the like, and including unsaturated alkyl groups, such as vinyl ($H_2C{=}CH{-}$), allyl ($H_2C{=}CH{-}CH_2{-}$), propynyl ($HC{\equiv}C{-}CH_2{-}$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Alkyl, aryl, and arylalkyl substituents can also be further substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Examples of photochromic azo compounds include azobenzene, 2-methoxyazobenzene, 2-hydroxyazobenzene, 3-methylazobenzene, 3-nitroazobenzene, 3-methoxyazobenzene, 3-hydroxyazobenzene, 4-iodoazobenzene, 4-bromoazobenzene, 4-chloroazobenzene, 4-fluoroazobenzene, 4-methylazobenzene, 4-carbomethoxyazobenzene, 4-acetylazobenzene, 4-carboxyazobenzene, 4-cyanoazobenzene, 4-ethoxyazobenzene, 4-methoxyazobenzene, 4-nitroazobenzene, 4-acetamidoazobenzene, 4-dimethylaminoazobenzene, 4-aminoazobenzene, 4-trimethylammonium azobenzene (with any suitable anion accompanying the ammonium cation, including (but not limited to $Cl^-$, $Br^-$, $I^-$, $HSO_4^-$, $SO_4^{2-}$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, $CH_3SO_3^-$, $CH_3C_6H_4SO_3^-$, $SO_3^{2-}$, $BrO_3^-$, $IO_3^-$, $ClO_3^-$, or the like, as well as mixtures thereof), 4-dimethylamino-4'-phenylazobenzene, 4-dimethylamino-4'-hydroxyazobenzene, 4,4'-bis-(dimethylamino)azobenzene, 4-dimethylamino-4'-p-aminophenylazobenzene, 4-dimethylamino-4'-p-acetamidophenylazobenzene, 4-dimethylamino-4'-p-aminobenzylazobenzene, 4-dimethylamino-4'-[β-(p-aminophenyl)ethyl]azobenzene, 4-dimethylamino-4'-mercuric acetate azobenzene, 4-hydroxyazobenzene, 2-methyl-4-hydroxyazobenzene, 4-hydroxy-4'-methylazobenzene, 2,6-dimethyl-4-hydroxyazobenzene, 2,2'-4',6,6'-pentamethyl-4-hydroxyazobenzene, 2,6-dimethyl-2',4',6'-trichloro-4-hydroxyazobenzene, 4-hydroxy-4'-chloroazobenzene, 2,2', 4',6'-tetrachloro-4-hydroxyazobenzene, 3-sulfonate-4-hydroxyazobenzene, 2,2'-dimethoxyazobenzene, 3,3'-dinitroazobenzene, 3,3'-dimethylazobenzene, 4,4'-dimethylazobenzene, 4,4'-dimethoxyazobenzene, 4,4'-dinitroazobenzene, 4,4'-dichloroazobenzene, 2,4-dimethoxyazobenzene, 2,6-dimethoxyazobenzene, 4-nitro-4'-methoxyazobenzene, 2,4,6-trimethylazobenzene, 2,3'-dimethoxy-4'-isobutyramidoazobenzene, 2,2',4,4',6,6'- hexamethylazobenzene, 2-hydroxy-5-methylazobenzene, 3,3'-disulfonateazobenzene, 4-methoxy-3'-sulfonateazobenzene, 4-methoxy-4'-sulfonateazobenzene, 2,4-dimethoxy-4'-sulfonateazobenzene, 2,2',4-trimethoxy-5'-sulfonateazobenzene, 4,4'-dimethoxy-3,3'-dicarboxylateazobenzene, 2,2'-azopyridine, 3,3'-azopyridine, 4,4'-azopyridine, 2-phenylazopyridine, 3-phenylazopyridine, 4-phenylazopyridine, 6,6'-azoquinoline, 1-phenylazonaphthalene, 1,1-azonaphthalene, a,2'-azonaphthalene, 2,2'-azonaphthalene, 1-phenylazo-4-naphthol, 1-phenylazo-4-methoxynaphthalene, 3-phenylazo-2-naphthol, 3-phenylazo-2-methoxynaphthalene, 1-(o-hydroxyphenylazo)-2-naphthol, 4-phenylazo-1-naphthylamine, 1-phenylazo-2-naphthylamine, and the like. Polymeric azo materials are also suitable. Aromatic azo compounds are well known and can be prepared as described in, for example, A. Natansohn et al., *Macromolecules*, vol. 25, p. 2268 (1992); G. Zimmerman et al., *J. Amer. Chem. Soc.*, vol. 80, p. 3528 (1958); W. R. Brode, in *The Roger Adams Symposium*, p. 8, Wiley (New York 1955); D. Gegiou et al., *J. Amer. Chem. Soc.*, vol. 90, p. 3907 (1968); S. Malkin et al., *J. Phys. Chem.*, vol. 66, p. 2482 (1962); D. Schulte-Frohlinde, *Ann.*, vol. 612, p. 138 (1958); E. I. Stearns, *J. Opt. Soc. Amer.*, vol. 32, p. 382 (1942); W. R. Brode et al., *J. Amer. Chem. Soc.*, vol 74, p. 4641 (1952); W. R. Brode et al., *J. Amer. Chem. Soc.*, vol 75, p. 1856 (1953); E. Fischer et al., *J. Chem. Phys.*, vol. 27, p. 328 (1957); G. Wettermark et al., *J. Amer. Chem. Soc.*, vol. 87, p. 476 (1965); G. Gabor et al., *J. Phys. Chem.*, vol. 72, p. 3266 (1968); M. N. Inscoe et al., *J. Amer. Chem. Soc.*, vol 81, p. 5634 (1959); E. Fischer et al., *J. Chem. Soc.*, vol. 1959, p. 3159 (1959); G. Gabor et al., *J. Phys. Chem.*, vol. 66, p. 2478 (1962); G. Gabor et al., *Israel J. Chem.*, vol. 5, p. 193 (1967); D. Bullock et al., *J. Chem. Soc.*, vol. 1965, p. 5316 (1965); R. Lovrien et al., *J. Amer. Chem. Soc.*, vol 86, p. 2315 (1964); J. H. Collins et al., *J. Amer. Chem. Soc.*, vol. 84, p. 4708 (1962); P. P. Birnbaum et al., *Trans. Faraday Soc.*, vol. 50, p. 1192 (1954); M. Frankel et al., *J. Chem. Soc.*, vol. 1955, p. 3441 (1955); E. Fischer et al., *J. Chem. Phys.*, vol. 23, p. 1367 (1955); E. Fischer, *J. Amer. Chem. Soc.*, vol. 82, p. 3249 (1960); H. Sterk et al., *Monatsch. Chem.*, vol. 99, p. 297 (1968); A. H. Cook et al., *J. Chem. Soc.*, vol. 1939, p. 1315 (1939); A. H. Cook et al., *J. Chem. Soc.*, vol. 1939, p. 1309 (1939); N. Campbell et al., *J. Chem. Soc.*, vol. 1953, p. 1281 (1953); P. P. Birnbaum et al., *Trans. Faraday Soc.*, vol. 49, p. 735 (1953); R. Lefevre et al., *J. Chem. Soc.*, vol. 1953, p. 867 (1953); G. S. Hartley, *J. Chem. Soc.*, vol. 1938, p. 633 (1938); J. H. Gould et al., *J. Opt. Soc. Amer.*, vol. 42, p. 380 (1952); G. Gabor et al., *J. Phys. Chem.*, vol. 72, p. 153 (1968); R. Lefevre et al., *J. Chem. Soc.*, vol. 1951, p. 1814 (1951); M. A. Horowitz et al., *J. Amer. Chem. Soc.*, vol. 77, p. 5011 (1955); and A. Winkel et al., *Ber.*, vol. 74B, p. 670 (1940), the disclosures of each of which are totally incorporated herein by reference.

Bisimidazoles are of the general formula

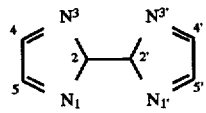

wherein substituents can be present on the 2, 4, 5, 2', 4', and 5' positions. examples of substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC-C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Specific examples of photochromic bisimidazoles include 2,2',4,4',5,5'-hexaphenyl bisimidazole, 2,2',4,4',5,5'-hexa-p-tolyl bisimidazole, 2,2',4,4',5,5'-hexa-p-chlorophenyl bisimidazole, 2,2'-di-p-chlorophenyl-4,4',5,5'-tetraphenyl bisimidazole, 2,2'-di-p-anisyl-4,4',5,5'-tetraphenyl bisimidazole, and the like. Bisimidazole compounds are known, and can be prepared as described in, for example, T. Hayashi et al., *Bull. Chem. Soc. Jap.*, vol. 33, p. 565 (1960), T. Hayashi et al., *J. Chem. Phys.*, vol. 32, p. 1568 (1960), T. Hayashi et al., *Bull. Chem. Soc. Jap.*, vol. 38, p. 2202 (1965), and D. M. White et al., *J. Org. Chem.*, vol. 29, p. 1926 (1964), the disclosures of each of which are totally incorporated herein by reference.

Bis-tetraphenylpyrrole is of the formula

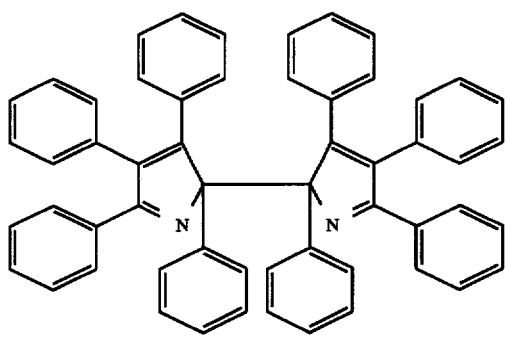

and can be prepared as disclosed in, for example, S. M. Blinder et al., *J. Chem. Phys.*, vol. 36, p. 540 (1962) and in G. Rio et al., *Acad. Sci., Paris, Ser. C*, vol. 263, p. 634 (1967), the disclosures of each of which are totally incorporated herein by reference.

Hydrazines are of the general formula

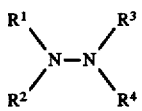

wherein $R^1$, $R^2$, $R^3$, and $R^4$ each, independently of the others, can be hydrogen, alkyl, preferably with from 1 to about 50 carbon atoms and more preferably with from 1 to about 30 carbon atoms, aryl, preferably with from about 5 to about 30 carbon atoms and more preferably with from about 5 to about 20 carbon atoms, and arylalkyl, preferably with from about 6 to about 50 carbon atoms and more preferably with from about 6 to about 30 carbon atoms. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more R groups can be joined together to form a ring.

Specific examples of hydrazines include hydrazine (wherein $R^1$, $R^2$, $R^3$, and $R^4$ are each hydrogen), 1,2-diphenylhydrazine, tetraphenylhydrazine, and the like. Hydrazines are well known and can be prepared as described in, for example, G. N. Lewis et al., *J. Amer. Chem. Soc.*, vol 64, p. 2801 (1942), D. A. Ramsay, *J. Phys. Chem.*, vol. 57, p. 415 (1953), P. F. Holt et al., *J. Chem. Soc.*, v. 1955, p. 98 (1955), and J. Weiss, *Trans. Faraday Soc.*, vol. 36, p. 856 (1940), disclosures of each of which are totally incorporated herein by reference.

Aryl disulfides are of the general formula

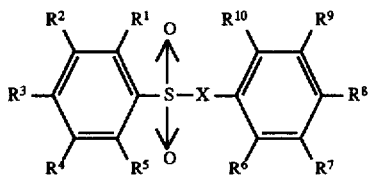

wherein X is a sulfur atom, an oxygen atom, or an $SO_2$ group and $R^1$, $R^2$, $R^3$, $R^4$, $R^5$, $R^6$, $R^7$, $R^8$, $R^9$, and $R^{10}$ each, independently of the others, can be hydrogen, alkyl, preferably with from 1 to about 50 carbon atoms and more preferably with from 1 to about 30 carbon atoms, aryl, preferably with from 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more R groups can be joined together to form a ring. Specific examples of aryl disulfide compounds include

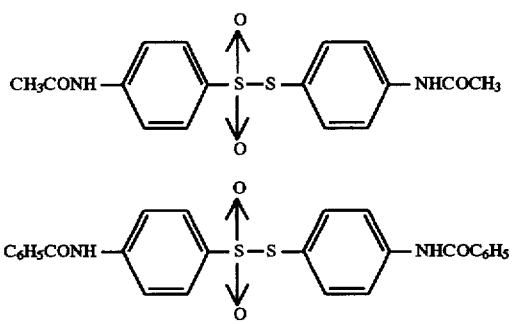

-continued

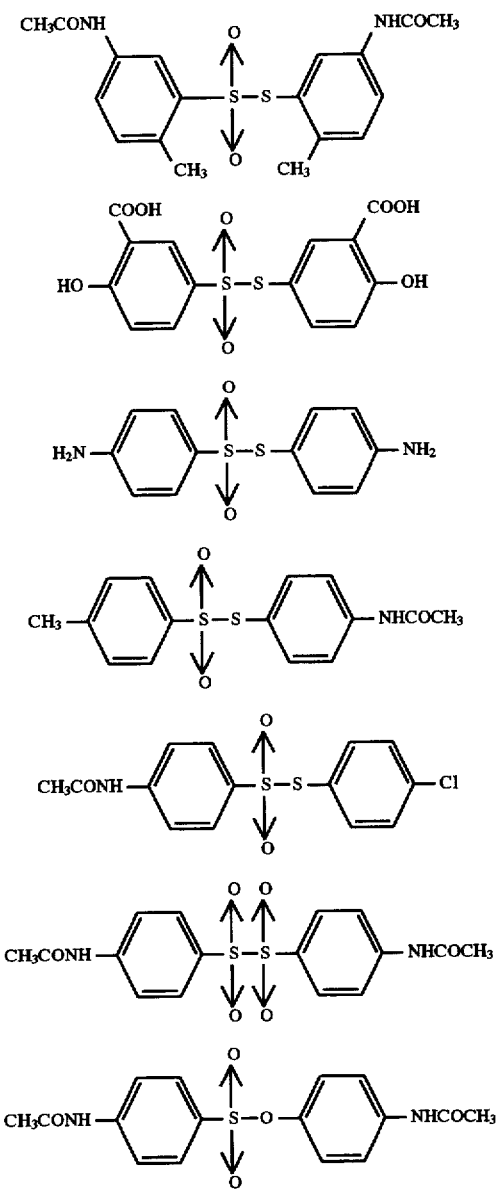

and the like. Aryl disulfide compounds are known, and can be prepared as described in, for example, C. M. Bere et al., *J. Chem. Soc.*, vol. 1924, p. 2359 (1924) and in R. Child et al., *J. Chem. Soc.*, vol. 1926, p. 2697 (1926), the disclosures of each of which are totally incorporated herein by reference.

Also suitable are compounds that exhibit tautomeric photochromic phenomena. Examples of these materials include those that undergo photochromic valence tautomerism, those that undergo hydrogen transfer, including keto-enol phototautomerism, aci-nitro phototautomerism, and those that undergo other forms of phototautomerism, such as the naphthacenequinones and their substituted derivatives, as well as polymers containing these moieties, which undergo photochromic transformation between the trans and ana forms as follows:

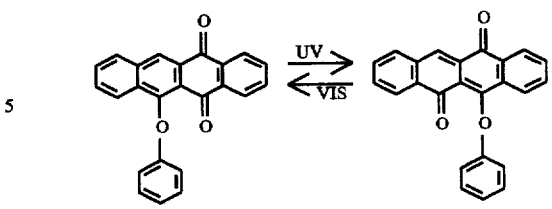

as disclosed in, for example, F. Buchholtz et al., Macromolecules, vol. 26, p. 906 (1993), the disclosure of which is totally incorporated herein by reference. Examples of suitable substituents include alkyl, preferably with from 1 to about 50 carbon atoms and more preferably with from 1 to about 30 carbon atoms, aryl, preferably with from 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Alkyl, aryl, and arylalkyl substituents can also be further substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Mixtures of two or more photochromic materials can also be employed.

Additional information regarding photochromic materials and the preparation and characterization thereof is disclosed in, for example, *Techniques of Chemistry, Vol. 3: Photochromism*, A. Weissberger and G. Brown, ed., John Wiley & Sons (New York 1971), and in *Photochromism: Molecules and Systems*, H. Durr and H. Bouas-Laurent, ed., Elsevier (New York 1990), the disclosures of each of which are totally incorporated herein by reference. Photochromic materials are also available from, for example, Aldrich Chemical Company, Milwaukee, Wis. (including 5480-8; 13,993-9; 26,813-5; 10,655-0; 30,832-3; 5492-1; 15,073-8; 21,515-5; 12,672-1; 39,0267; and the like), Eastman Kodak Company, Rochester, N.Y. (including 1817; 13080; 704; 9439; 11012; 902; and the like), Lancaster Synthesis Inc., Windham, N.H. (including 2002; 4555; 4956; 4364; and the like), Fluka Chemika-BioChemika, Buchs, Switzerland (including 85868; 85870; 85875; 12801; and the like) and the like.

The photochromic material is present in the marking material in any amount effective to impart the desired color and intensity under the appropriate light conditions. Typically, the photochromic material is present in the marking material in an amount of from about 1 to about 20 percent by weight, preferably from about 5 to about 10 percent by weight, although the amount can be outside these ranges.

The photochromic shift from the first state to the second state can be effected by any method suitable for the photochromic material or materials selected for the marking material. Examples of methods for inducing the photochromic shift include irradiation with radiation of a suitable wavelength, typically from about 200 to about 400 nanometers, although the wavelength can be outside this range. The reverse photochromic effect can be induced by irradiation with visible light, typically in the wavelength range of from about 400 to about 700 nanometers, although the wavelength can be outside this range, or by the application of heat.

The photochromic marking material can be applied to the desired substrate by any desired or suitable method. Suitable methods include, but are not limited to, electrostatic printing processes such as electrophotography and ionography, wherein an electrostatic latent image is formed and developed with a photochromic marking material, either dry or liquid; ink jet printing processes, including both continuous stream processes and drop on demand processes (including piezoelectric, thermal or bubble jet, or the like), wherein droplets of an ink containing a photochromic material are jetted in imagewise fashion onto the desired substrate; hot melt ink jet processes, wherein an ink containing a photochromic material is solid at room temperature and liquid at elevated temperatures and wherein the ink is heated to a temperature above its melting point and jetted onto a substrate in an imagewise fashion; conventional printing processes, including lithographic and flexographic processes; or the like.

The photochromic marking material can be applied to any desired substrate. Examples of suitable substrates include (but are not limited to) plain papers such as Xerox® 4024 papers, ruled notebook paper, bond paper, silica coated papers such as Sharp Company silica coated paper, Jujo paper, and the like, transparency materials, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Three toner compositions are prepared by dissolving in dichloromethane a toner resin comprising a bisphenol A fumarate polyester resin (having an onset glass transition temperature (Tg) of 55° C. as measured by differential scanning calorimetry, $M_n$=6,200, $M_w$=13,500, $M_n/M_w$=2.18 as measured by gel permeation chromatography), and the photochromic material indicated in the table below. Thereafter, the solvent is removed and the resulting material is dried under vacuum at 75° C. and ground with a mortar and pestle to particles with average particle diameter of about 10 microns.

| Photochromic Compound | % by weight dichloromethane: polyester: photochrome | Photochrome Concentration in Solids (remainder being polyester resin) | Color at 600 nm exposure | Color at 366 nm exposure |
| --- | --- | --- | --- | --- |
| SP1 | 95.0:4.5:0.5 | 10% by weight | light red | purple |
| SP1 | 95.0:2.5:2.5 | 50% by weight | orange | purple |
| SO1 | 95.0:4.5:0.5 | 10% by weight | colorless | blue |

The toner particles thus prepared are used to develop via cascade development an image on a xeroprinting master film having a potential difference of 200 volts between the imaged areas and nonimaged areas. The toner particles preferentially adhere to the imaged areas. The images generated are similar in shape to those of FIG. 1 and are printed in a density of about 10×10 pel marks, enabling a density of 900 data bits per square inch. Thereafter, the toner particles are transferred to paper using corona charging of opposite sign and are subsequently fused to the paper by placing the paper in an oven at 150° C. for about 1 minute. The entire process is repeated using transparency substrate instead of paper. The images thus formed on paper and transparency stock are exposed to ultraviolet light at 366 nanometers to induce the photochromic effect and subsequently exposed to red light at 600 nanometers to reverse the photochromic effect. The process is repeated several times.

The images are colorless when originally generated. One third of the glyph shapes are covered during the entire procedure. Two thirds of the glyph shapes are exposed to ultraviolet light, causing instantaneous ring opening of the spirooxazine compound and blue color formation. Half of the glyphs converted to the blue color are then covered and the remaining half are exposed to visible light from a flashgun, causing rapid fading of the blue color and invisibility of these glyphs.

EXAMPLE II

In a Union Process 1-S Attritor (Union Process Co., Akron, Ohio) is placed 200 grams of a copolymer of ethylene and methacrylic acid (89:11 molar ratio) with a melt index at 190° C. of 100 and an Acid Number of 66, 22 grams of a photochromic material (1,3-dihydro-1,3,3-trimethylspiro[2H-indole-2,3'-[3H]-naphth[2,1-b][1,4H] oxazine, available from Aldrich Chemical Co., Milwaukee, Wis.), and 1000 grams of Isopar® L (Exxon Corp.). The attritor contents are heated to 100° C., and milled at a rotor speed of 230 rpm with 4.76 mm diameter stainless steel balls for two hours. The attritor is then cooled to room temperature while the milling is continued. Subsequently, 700 grams of Isopar® H is added to the attritor contents and milling is continued at a rotor speed of 330 rpm for 3 hours. The resulting particulate polymer dispersion is then drained to a holding tank. Thereafter, 92 grams of Basic Barium Petronate (Witco Chemical, New York, N.Y.) are added to the dispersion with stirring. Sufficient Isopar® H is also added to the dispersion to result in a 2 percent by weight solids dispersion, and the dispersion is stirred for 3 hours. The electrophoretic developer thus formed is incorporated into a Savin 870 copier and images are generated on paper. It is believed that the images thus generated will be initially colorless, will turn blue upon exposure to ultraviolet light, and will return to a colorless state upon exposure to visible-spectrum light as described in Example I.

EXAMPLE III

A photochromic liquid developer suitable for development of electrostatic latent images is prepared as follows. A copolymer of ethylene (90% by weight) and methacrylic acid (10% by weight) (Nucrel 599, available from E. I. Du Pont de Nemours & Co., Wilmington, Del., 3.90 g), an aluminum stearate charge control agent (Witco 22, available from Witco Chemical Co., Des Plaines, Ill., 0.1 g), a photochromic material (1,3-dihydro-1,3,3-trimethylspiro[2H-indole-2,3'-[3H]-naphth[2,1-b][1,4]oxazine, available from Aldrich Chemical Co., Milwaukee, Wis., 1.00 g), and an isoparaffinic hydrocarbon liquid (Isopar® L, available from Noco Lubrication, Tonawanda, N.Y., 170 g) are heated in a Union Process 01 attritor containing 2,400 grams of stainless steel 3/16 inch chrome-coated shot until 200° F. is achieved. After 10 minutes, heating is discontinued and ambient temperature stirring is maintained for 2 hours. Water cooling and stirring are then continued for 4 more hours. The ink is then washed from the shot with 63.1 g of Isoparl® L using a strainer, and additional Isopar® L is then added, resulting in a developer with a solids content of about 1 percent by weight. This developer at 1 percent by weight solids and with suitable charge director (lecithin added dropwise until a conductivity of 12 picomhos per centimeter is achieved) can be used for the development of liquid immersion images by incorporating the ink into a Savin 870 photocopier and generating and developing images. It is believed that the images thus generated will be initially colorless, will turn blue upon exposure to ultraviolet light, and will return to a colorless state upon exposure to visible-spectrum light as described in Example I.

EXAMPLE IV

A photochromic liquid developer suitable for development of electrostatic latent images by a polarizable liquid development process is prepared as follows. A photochromic material (1,3-dihydro-1,3,3-trimethylspiro[2H-indole-2,3'-[3H]-naphth[2,1-b][1,4]oxazine, available from Aldrich Chemical Co., Milwaukee, Wis., 12 parts by weight), polyvinyl pyrrolidone dispersing agent (PVP-K15, available from GAF Corp., 6 parts by weight), a modified phenolic resin (15 parts by weight), and triethylene glycol monobutyl ether (67 parts by weight) are admixed to form a developer composition. Thereafter, the developer is incorporated into a xerographic imaging test fixture containing a layered imaging member comprising an aluminum substrate, a photogenerating layer of trigonal selenium, 90 percent by weight, dispersed in 10 percent by weight of polyvinyl carbazole, and a charge transport layer containing N,N'-diphenyl-N,N-bis(3-methylphenyl) 1,1'-biphenyl-4,4'-diamine molecules, 55 percent by weight, dispersed in 45 percent by weight of the polycarbonate resinous binder Makrolon, which member has been negatively charged. A latent image on the layered member is curtailed with the developer composition utilizing a gravure roll, wherein the developer is attracted to the latent image by the application of an electric field of about 1,000 volts/cm. Subsequently, the developed images are electrostatically transferred to paper. It is believed that the images thus generated will be initially colorless, will turn blue upon exposure to ultraviolet light, and will return to a colorless state upon exposure to visible-spectrum light as described in Example I.

EXAMPLE V

A photochromic liquid developer suitable for development of electrostatic latent images by a polarizable liquid development process is prepared as follows. A photochromic material (1,3-dihydro-1,3,3-trimethylspiro[2H-indole-2,3'-[3H]-naphth[2,1-b][1,4]oxazine, available from Aldrich Chemical Co., Milwaukee, Wis., 12 parts by weight), polyvinyl pyrrolidone dispersing agent (PVP-K15, available from GAF Corp., 6 parts by weight), a glycerol ester of hydrogenated rosin binder (Staybelite Ester 5, available from Hercules, Inc., 15 parts by weight), dibutyl phthalate (66.75 parts by weight), and a tetrabutyl ammonium bromide conductivity enhancing agent (0.25 parts by weight) are admixed to form a developer composition. Thereafter, the developer is incorporated into a xerographic imaging test fixture containing a layered imaging member comprising an aluminum substrate, a photogenerating layer of trigonal selenium, 90 percent by weight, dispersed in 10 percent by weight of polyvinyl carbazole, and a charge transport layer containing N,N'-diphenyl-N,N-bis(3-methylphenyl) 1,1'-biphenyl-4,4'-diamine molecules, 55 percent by weight, dispersed in 45 percent by weight of the polycarbonate resinous binder Makrolon, which member has been negatively charged. A latent image on the layered member is curtailed with the developer composition utilizing a gravure roll, wherein the developer is attracted to the latent image by the application of an electric field of about 1,000 volts/cm. Subsequently, the developed images are electrostatically transferred to paper. It is believed that the images thus generated will be initially colorless, will turn blue upon exposure to ultraviolet light, and will return to a colorless state upon exposure to visible-spectrum light as described in Example I.

EXAMPLE VI

Ink compositions of the present invention with the following ingredients (percentages are by weight) are prepared by first admixing the photochromic material and the organic component (and filtering the mixture, if desired), followed by admixing the remaining ingredients, heating to a temperature sufficient to establish a stable microemulsion, and shaking, followed by cooling:

Ink 1:

2.0% 1',3'-dihydro-1',3',3'-trimethyl-6-nitrospiro[2H-1-benzopyran-2-2'-(2H)-indole] (photochromic material, available from Aldrich Chemical Company, Milwaukee, Wis.), of the formula

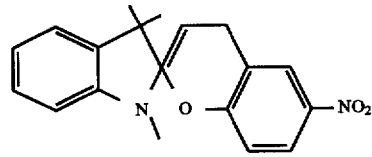

33.3% polyoxyethylene (10) stearyl ether surfactant (Brij 76, obtained from ICI Americas, Inc., Wilmington, Del.), 48.0% water, 16.7% mixture containing 50% methyl ethyl ketone and 50% 2,4-pentanedione.

Ink 2:

2.0% 1,3-dihydro-1,3,3-trimethylspiro[2H-indole-2,3'-[3H]naphth[2,1-b][1,4]oxazine (photochromic material, available from Aldrich Chemical Company, Milwaukee, Wis.), of the formula

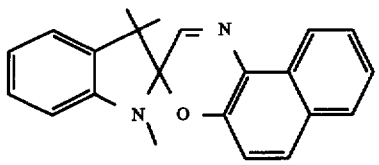

40.7% Brij 76 surfactant, 40.7% water, 16.6% mixture containing 50% methyl ethyl ketone and 50% 2,4-pentanedione.

Ink 3:

2.0% 1',3'-dihydro-1',3',3'-trimethyl-6-nitrospiro[2H-1-benzopyran-2,2'-(2H)indole], 57.8% sodium dioctyl sulfosuccinate (aerosol) surfactant (obtained from American Cyanamid, Wayne, N.J.), 10.8% water, 29.4% methyl ethyl ketone.

Ink 4:

1.5% 1,3-dihydro-1,3,3-trimethylspiro[2H-indole-2,3'-[3H]naphth[2,1-b][1,4]oxazine, 54.1% sodium dioctyl sulfosuccinate (aerosol) surfactant, 14.8% water, 29.6% methyl ethyl ketone.

Ink 5:

6.0% 1',3'-dihydro-1',3',3'-trimethyl-6-nitrospiro[2H-1-benzopyran-2,2'-(2H)indole], 27.8% Brij 76 surfactant, 22.6% water, 17.3% methyl ethyl ketone, 7.5% ethanol, 18.8% hexane.

Ink 6:

1.5% 1,3-dihydro-1,3,3-trimethylspiro[2H-indole-2,3'-[3H]naphth[2,1-b][1,4]oxazine, 5.5% Oil Jet black dye (obtained from Keystone Aniline Corp., Chicago, Ill.), 27.5% Brij 56 polyoxyethylene (10) cetyl ether surfactant (obtained from ICI Americas, Inc., Wilmington, Del.), 22.4% water, 16.8% methyl ethyl ketone, 7.7% ethanol, 18.6% hexane.

These inks are each incorporated into a thermal ink jet printing test fixture equipped with a Hewlett-Packard DeskJet® printhead modified with an aluminum block heater inserted into the cartridge. The printhead cartridge is heated to temperatures of from about 90° to about 110° C. to result in printhead face temperatures of from about 65° to about 85° C. to enable drop ejection. Images are generated by jetting the inks onto Xerox® Archival bond (25% cotton) plain paper to form images similar in shape to those of FIG. 1 and printed in a density of about 10×10 pel marks, enabling a density of 900 data bits per square inch. It is believed that all of the inks are capable of being jetted at these temperatures. The images thus formed with the inks containing 1,3-dihydro-1,3,3-trimethylspiro[2H-indole-2,3'-[3H]naphth[2,1-b][1,4]oxazine are essentially invisible to the naked eye and the images thus formed with the inks containing 1',3'-dihydro-1',3',3'-trimethyl-6-nitrospiro[2H-1-benzopyran-2,2'-(2H)indole] are orange or red in color. Upon subsequent irradiation with a Blak Ray longwave UV lamp (model B-100A, San Gabriel, Calif.), it is believed that the print pattern will appear blue for the images generated with the inks containing 1,3-dihydro-1,3,3-trimethylspiro[2H-indole-2,3'-[3H]-naphth[2,1b][1,4]oxazine and purple for the images generated with the inks containing 1',3'-dihydro-1',3',3'-trimethyl-6-nitrospiro[2H-1-benzopyran-2,2'-(2H)indole]. Thereafter, it is believed that exposure of the print pattern to incandescent light will return the print to its original appearance.

EXAMPLE VII

Ink compositions of the present invention with the following ingredients (percentages are by weight) are prepared by admixing the following ingredients at 75° C. with stirring to dissolve the surfactant in the other ingredients and form a liquid microemulsion, followed by cooling to room temperature to obtain a liquid crystalline gel:

Ink 7:

30% polyoxyethylene (20) stearyl ether surfactant (Brij 78, obtained from ICI Americas. Inc. Wilmington, Del.), 60% water, 10% 1',3'-dihydro-1',3',3'-trimethyl-6-nitrospiro[2H-1-benzopyran-2,2'-(2H)indole]

Ink 8:

30% polyoxyethylene (20) stearyl ether surfactant (Brij 78, obtained from ICI Americas, Inc., Wilmington, Del.), 50% water, 20% 1,3-dihydro-1,3,3-trimethylspiro[2H-indole-2,3'-[3H]naphth[2,1-b][1,4]oxazine The ink compositions thus prepared can be incorporated into a thermal ink jet printing test fixture as described in Example V]; and employed to generate images on plain paper. The images thus formed with the inks containing 1,3-dihydro-1,3,3-trimethylspiro[2H-indole-2,3'-[3H]naphth[2,1-b][1,4]oxazine are essentially invisible to the naked eye and the images thus formed with the inks containing 1',3'-dihydro-1',3',3'-trimethyl-6-nitrospiro[2H-1-benzopyran-2,2'-(2H)indole] are orange or red in color. Upon subsequent irradiation with a Blak Ray longwave UV lamp (model B-100A, San Gabriel, Calif.), it is believed that the print pattern will appear blue for the images generated with the inks containing 1,3-dihydro-1,3,3-trimethylspiro[2H-indole-2,3'-[3H]-naphth[2,1-b],[1,4]oxazine and purple for the images generated with the inks containing 1',3'-dihydro-1',3',3'-trimethyl-6-nitrospiro[2H-1-benzopyran-2,2'-(2H)indole]. Thereafter, it is believed that exposure of the print pattern to incandescent light will return the print to its original appearance.

EXAMPLE VIII

Ink compositions of the present invention with the following ingredients (percentages are by weight) are prepared by first admixing the photochromic material and the organic component and filtering the mixture if desired, followed by admixing the remaining ingredients, heating to a temperature sufficient to establish a stable microemulsion, and shaking, followed by cooling:

Ink 9:

4.1% 1',3'-dihydro-1',3',3'-trimethyl-6-nitrospiro[2H-1-benzopyran-2,2'-(2H)indole], 6.3% sodium dioctyl sulfosuccinate surfactant (Aerosil OT, obtained from American Cyanamid Co., Wayne, N.J.), 29.0% water, 60.6% cyclohexanone.

Ink 10:

4.1% 1,3-dihydro-1,3,3-trimethylspiro[2H-indole-2,3'[3H]naphth[2,1-b][1,4]oxazine, 6.9% sodium dodecyl sulfonate surfactant (obtained from E. I. Du Pont de Nemours & Co., Wilmington, Del.), 30.0% water, 59.0% cyclohexanone.

Ink 11:

3.5% 1',3'-dihydro-1',3',3'-trimethyl-6-nitrospiro[2H-1-benzopyran-2,2'-(2H)indole], 4.5% sodium dioctyl sulfosuccinate surfactant (Aerosil OT, obtained from American Cyanamid Co., Wayne, N.J.), 31.5% water, 52.6% cyclohexanone, 7.9% ethanol.

Ink 12:

3.5% 1,3-dihydro-1,3,3-trimethylspiro[2H-indole-2,3'[-3H]naphth[2,1-b][1,4]oxazine, 3.9% sodium dodecyl sulfonate surfactant (obtained from E. I. Du Pont de Nemours & Co., Wilmington, Del.), 30.6% water, 45.0% cyclohexanone, 11.6% methyl cellosolve.

Ink 13:

3.4% 1',3'-dihydro-1',3',3'-trimethyl-6-nitrospiro[2H-1-benzopyran-2,2'-(2H)indole], 5.6% sodium dodecyl sulfonate surfactant (obtained from E. I. Du Pont de Nemours & Co., Wilmington, Del.), 30.0% water, 51.5% cyclohexanone, 2.1% ethanol, 5.3% ethylene glycol.

EXAMPLE VII

Ink 14:

3.8% 1,3-dihydro-1,3,3-trimethylspiro[2H-indole-2,3'-[3H]-naphth[2,1-b][1,4]oxazine, 5.0% cetyl trimethyl ammonium bromide surfactant, 29.1% water, 51.5% cyclohexanone, 6.0% ethanol, 4.6% methyl cellosolve.

The inks thus formed will contain a relatively small concentration of liquid crystalline phase prior to jetting; this phase, however, will become concentrated upon evaporation of water from the ink subsequent to jetting.

These inks are incorporated into a thermal ink jet printing test fixture equipped with a Hewlett-Packard Desk jet® printhead. Images similar in shape to those of FIG. 1 and printed in a density of about 10×10 pel marks, enabling a density of 900 data bits per square inch are generated by jetting the inks onto a variety of plain papers. It is believed that all of the inks will exhibit good printhead operability, being readily jettable with little or no maintenance intervention. The images thus formed with the inks containing 1,3-dihydro-1,3,3-trimethylspiro[2H-indole-2,3'-[3]-naphth[2,1-b][1,4]oxazine are essentially invisible to the naked eye and the images thus formed with the inks containing 1',3'-dihydro-1',3',3'-trimethyl-6-nitrospiro[2H-1-benzopyran-2,2'-(2H)indole] are orange or red in color. Upon subsequent irradiation with a Blak Ray longwave UV lamp (model B-100A, San Gabriel, Calif.), it is believed that the print pattern will appear blue for the images generated with the inks containing 1,3-dihydro-1,3,3-trimethylspiro[2H-indole-2,3'-[3]Jnaphth[2,1-b][1,4]oxazine and purple for the images generated with the inks containing 1',3'-dihydro-1',3',3'-trimethyl-6-nitrospiro[2H-1-benzopyran-2,2'-(2H)indole]. Thereafter, it is believed that exposure of the print pattern to incandescent light will return the print to its original appearance.

Optionally, the paper can be heated to a temperature of about 100° C. by a heating block situated under the paper sheet to increase drying time and concentration of the liquid crystalline phase in the ink subsequent to jetting.

EXAMPLE IX

An ink composition is prepared as follows. Phospholipid liposomes or vesicles containing a spiropyran are prepared by first dissolving 0.05 gram of the photochrome 1',3'-dihydro-1',3',3'-trimethyl-6-nitrospiro [2H-1-benzopyran-2-2'-(2H)-indole] (hereinafter referred to as 6-nitro-BIPS, obtained from Aldrich Chemical Company, Milwaukee, Wis.) in 1 milliliter of toluene. A second solution is prepared by dissolving 0.5 gram of Proliposome H paste (obtained from Lucas-Meyer, France) as received from the manufacturer in 8.45 milliliters of deionized water. The two solutions are admixed with stirring at room temperature until all of the Proliposome H is dissolved. Thereafter, the mixture is sonicated for 1 minute (28 watts) using a Horiba sonic disrupter. The temperature of the solution during sonication increases to about 70° C., causing the solution to change color from milky white to light purple. The solution returns to its original color once the mixture is cooled to room temperature. The ink thus formed is incorporated into a Hewlett-Packard DeskJet 500 thermal ink jet printer and used to print images similar in shape to those of FIG. 1 and printed in a density of about 10×10 pel marks, enabling a density of 900 data bits per square inch on the wire side of Courtland Acid paper. The image thus formed is essentially invisible to the naked eye. Upon subsequent irradiation with a Blak Ray longwave UV lamp (model B-100A, San Gabriel, Calif.), the print pattern appears bright purple. Thereafter, exposure of the print pattern to incandescent light returns the print to its original colorless appearance.

EXAMPLE X

An ink composition is prepared as follows. Phospholipid liposomes or vesicles containing a spiropyran are prepared by first dissolving 0.2 gram of 6-nitro-BIPS (obtained from Aldrich Chemical Company, Milwaukee, Wis.) in 2 milliliters of toluene. A second solution is prepared by dissolving 0.5 gram of Proliposome H paste (obtained from Lucas-Meyer, France) as received from the manufacturer in 8 milliliters of deionized water. The two solutions are admixed with stirring at room temperature until all of the Proliposome H is dissolved. Thereafter, the mixture is sonicated for 2 minutes (28 watts) using a Horiba sonic disrupter. The ink thus formed is incorporated into a Hewlett-Packard DeskJet 500 thermal ink jet printer and used to print images similar in shape to those of FIG. 1 and printed in a density of about 10×10 pel marks, enabling a density of 900 data bits per square inch on a transparency sheet having a coating containing 1 gram of silica per side. The image thus formed was essentially invisible to the naked eye. Upon subsequent irradiation with a Blak Ray longwave UV lamp (model B-100A, San Gabriel, Calif.), the print pattern appeared bright purple. Thereafter, exposure of the print pattern to incandescent light returned the print to its original colorless appearance.

EXAMPLE XI

Ink compositions with the following ingredients are prepared by melt mixing the photochromic material with the ink vehicle, and specifically by heating the mixture to a temperature slightly beyond the temperature at which the mixture melts, stirring until a homogeneous melt mixture is obtained, and subsequently cooling the mixture to room temperature. The ink compositions are then incorporated into a piezoelectric phase-change ink jet printer such as a Tektronix Phaser™ 340. The ink typically is heated to a temperature of from about 100° to about 130° C. An electric pulse from the printhead propels droplets of the ink onto the substrate (such as paper) in an imagewise fashion. This particular printer has cold-pressure fusing to smooth out the image. The viscosity of the ink compositions at the heated temperature typically is less than about 20 centipoise. Images are generated similar in shape to those of FIG. 1 and printed in a density of about 10×10 pel marks, enabling a density of 900 data bits per square inch.

Ink 1: 5.0 percent by weight 1'-octadecyl-3',3'-dimethyl-5'-methyl-6-nitro-8-(docosanoyloxymethyl)spiro[2H-1-benzopyran-2,2'-indoline], available from Nippon Kanko-Shikiso Kenkyusho Company, of the formula

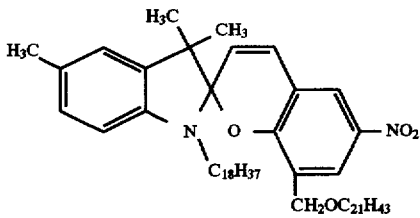

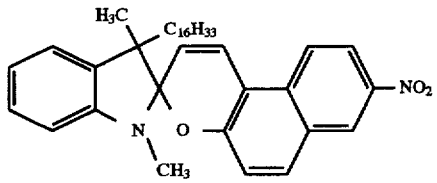

and 95.0 percent by weight Petrolite CA-11, a urethane derivative of oxidized synthetic or petroleum waxes, available from Petrolite Corporation Polymers Division Headquarters, Tulsa, Okla. It is believed that the image formed by this ink will be faint orange or faint red in color. Upon subsequent irradiation with a Blak Ray longwave UV lamp (model B-100A, San Gabriel, Calif.), it is believed that the print pattern will appear purple. Thereafter, it is believed that exposure of the print pattern to incandescent light will return the print to its original appearance.

Ink 2: 5.0 percent by weight 1'-octadecyl-3',3'-dimethyl-5'-methyl-6-nitro-8-(docosanoyloxymethyl) spiro[2H-1-benzopyran-2,2'-indoline], available from Nippon Kanko-Shikiso Kenkyusho Company, and 95.0 percent by weight Unithox 420, an ethoxylated alcohol available from Petrolite Corporation Polymers Division Headquarters, Tulsa, Okla. It is believed that the image formed by this ink will be faint orange or faint red in color. Upon subsequent irradiation with a Blak Ray longwave UV lamp (model B-100A, San Gabriel, Calif.), it is believed that the print pattern will appear purple. Thereafter, it is believed that exposure of the print pattern to incandescent light will return the print to its original appearance.

Ink 3: 8.0 percent by weight 1-octadecyl-3,3-dimethylspiro[2H-indole-2,3'-[3]-naphth[2,1b]-[1,4] oxazine, of the formula

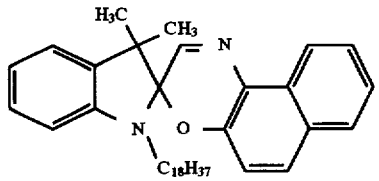

and 92 percent by weight Unithox 480, an ethoxylated alcohol available from Petrolite Corporation Polymers Division Headquarters, Tulsa, Okla. It is believed that the image formed by this ink will be colorless. Upon subsequent irradiation with a Blak Ray longwave UV lamp (model B-100A, San Gabriel, Calif.), it is believed that the print pattern will appear blue. Thereafter, it is believed that exposure of the print pattern to incandescent light will return the print to its original appearance.

Ink 4: 5.0 percent by weight 1,3-dimethyl-3-hexadecyl-8'-nitrospiro-(indoline 2,3'-)3H)-naphtho (2,1b)-pyran), prepared as disclosed in, for example, M. Morin et al., Can. J. Chem., vol. 58, p. 2038 (1980), the disclosure of which is totally incorporated herein by reference, of the formula and 95.0 percent by weight Ceramer 1608, a modified maleic anhydride hydrocarbon adduct of polyolefins prepared by graft copolymerization, available from Petrolite Corporation Polymers Division Headquarters, Tulsa, OK. It is believed that the image formed by this ink will be colorless. Upon subsequent irradiation with a Blak Ray longwave UV lamp (model B-100A, San Gabriel, Calif.), it is believed that the print pattern will appear colored. Thereafter, it is believed that exposure of the print pattern to incandescent light will return the print to its original appearance.

Ink 5: 7.0 percent by weight 1'-octadecyl-3',3'-dimethyl-5'-methyl-6-nitro-8-(docosanoyloxymethyl) spiro[2H-1-benzopyran-2,2'-indoline], available from Nippon Kanko-Shikiso Kenkyusho Company, and 93.0 percent by weight Ceramer 5005, a modified maleic anhydride hydrocarbon adduct of polyolefins prepared by graft copolymerization, available from Petrolite Corporation Polymers Division Headquarters, Tulsa, Okla. It is believed that the image formed by this ink will be faint orange or faint red in color. Upon subsequent irradiation with a Blak Ray longwave UV lamp (model B-100A, San Gabriel, Calif.), it is believed that the print pattern will appear purple. Thereafter, it is believed that exposure of the print pattern to incandescent light will return the print to its original appearance.

EXAMPLE XII

Ink compositions of the present invention with the following ingredients are prepared by melt mixing. The mixture is heated to a temperature slightly beyond the temperature at which the mixture melts, stirred until a homogeneous melt mixture is obtained, and subsequently cooled to room temperature. The material is then jetted onto Xerox® 4024 paper and onto polysulfone transparency material by incorporating it into a thermal ink jet printing test fixture equipped with a Hewlett-Packard DeskJet® printhead modified with an aluminum block heater inserted into the cartridge. Images are generated similar in shape to those of FIG. 1 and printed in a density of about 10×10 pel marks, enabling a density of 900 data bits per square inch. It is believed that the images formed by these inks will be faint orange or faint red in color. Upon subsequent irradiation with a Blak Ray longwave UV lamp (model B-100A, San Gabriel, Calif.), it is believed that the print patterns will appear purple. Thereafter, it is believed that exposure of the print patterns to incandescent light will return the prints to their original appearance.

Ink 6: 57.0 percent by weight decyl sulfone, 38.0 percent by weight imidazole, and 5.0 percent by weight 1'-octadecyl-3',3'-dimethyl-5'-methyl-6-nitro-8-(docosanoyloxymethyl)spiro[2H-1-benzopyran-2,2'-indoline], available from Nippon Kanko-Shikiso Kenkyusho Company.

Ink 7: 32.0 percent by weight Unithox 720, 27.0 percent by weight Unithox 550, 8.0 percent by weight palmitic acid, 27.0 percent by weight dimethyl sulfone, and 6.0 percent by weight 1'-octadecyl-3',3'-dimethyl-5'-methyl-6-nitro-8-(docosanoyloxymethyl) spiro[2H-1-benzopyran-2,2'-indoline]; available from Nippon Kanko-Shikiso Kenkyusho Company.

Other embodiments and modifications of the present invention may occur to those skilled in the art subsequent to a review of the information presented herein, these embodiments and modifications, as well as equivalents thereof, are also included within the scope of this invention.

What is claimed is:

1. A method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in at least some of the photochromic marking material from the first state to the second state, wherein a first portion of the photochromic marking material is caused to shift from the first state to the second state and a second portion of the photochromic marking material remains in the first state.

2. A method according to claim 1 wherein the machine readable code format comprises a set of distinguishable symbols including a first symbol for encoding 0s and a second symbol for encoding 1s, wherein said symbols are written on a substantially constant center-to-center spacing.

3. A method according to claim 1 wherein the machine readable code format comprises a set of glyphs wherein each glyph corresponds to a digital value of bit length n and wherein the set comprises $2^n$ distinctive shapes.

4. A method according to claim 3 wherein said glyphs are elongated along axes that are tilted at angles of plus and minus about 45° with respect to a horizontal axis to discriminate at least some of said digital values from each other.

5. A method according to claim 1 wherein the photochromic change in the photochromic marking material from the first state to the second state is effected by irradiation with radiation at a selected wavelength.

6. A method according to claim 5 wherein said radiation is within the ultraviolet wavelength band.

7. A method according to claim 1 wherein the photochromic marking material in the second state subsequently is caused to undergo another photochromic change, thereby returning it to the first state.

8. A method according to claim 1 wherein the photochromic marking material in the second state subsequently is caused to undergo another photochromic change effected by irradiation with visible light, thereby returning it to the first state.

9. A method according to claim 1 wherein the photochromic marking material in the second state subsequently is caused to undergo another photochromic change effected by heating, thereby returning it to the first state.

10. A method according to claim 1 wherein the photochromic marking material comprises a material selected from the group consisting of spiropyrans, spirooxazines, spirothiopyrans, and mixtures thereof.

11. A method according to claim 1 wherein the photochromic marking material is applied to the substrate by an electrostatic imaging process.

12. A method according to claim 1 wherein the photochromic marking material is applied to the substrate by an ink jet printing process.

* * * * *